United States Patent [19]

Fukawa et al.

[11] Patent Number: 4,772,679
[45] Date of Patent: Sep. 20, 1988

[54] CRYSTALLINE AROMATIC POLYKETONE AND PROCESS FOR PRODUCING THE SAME

[75] Inventors: Isaburo Fukawa; Haruyuki Yoneda; Hisaya Sakurai, all of Fuji, Japan

[73] Assignee: Asahi Kasei Kogyo Kabushiki Kaisha, Osaka, Japan

[21] Appl. No.: 808,502

[22] Filed: Dec. 13, 1985

[30] Foreign Application Priority Data

| Dec. 14, 1984 | [JP] | Japan | 59-264145 |
| Dec. 17, 1984 | [JP] | Japan | 59-264608 |
| Feb. 28, 1985 | [JP] | Japan | 60-37716 |
| Mar. 1, 1985 | [JP] | Japan | 60-40929 |
| Jun. 10, 1985 | [JP] | Japan | 60-125493 |
| Jun. 18, 1985 | [JP] | Japan | 60-130704 |
| Jun. 27, 1985 | [JP] | Japan | 60-139137 |
| Jul. 19, 1985 | [JP] | Japan | 60-158014 |

[51] Int. Cl.$^4$ .......................... C08G 2/00; C08G 4/00
[52] U.S. Cl. .................................. 528/220; 528/226; 528/125; 528/128
[58] Field of Search .............. 528/220, 226, 125, 128

[56] References Cited

U.S. PATENT DOCUMENTS 3,432,468  3/1969  Gabler et al. ...................... 528/374
4,320,224  3/1982  Rose et al. ......................... 528/125

FOREIGN PATENT DOCUMENTS 0152161   4/1985  Eupropean Pat. Off. .......... 528/220
0135938   4/1985  European Pat. Off. .
60-120720 6/1985  Japan .
1255588  12/1971  United Kingdom ............... 528/226
1264900   2/1972  United Kingdom .
1295584  11/1972  United Kingdom .
1368967  10/1974  United Kingdom .

Primary Examiner—John Kight
Assistant Examiner—M. L. Moore
Attorney, Agent, or Firm—Birch, Stewart, Kolasch & Birch

[57] ABSTRACT

Crystalline aromatic polyketones having a linear polymer structure comprising repeating units [I] of

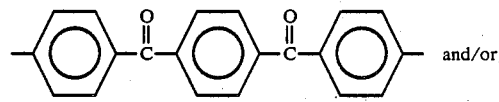 and/or

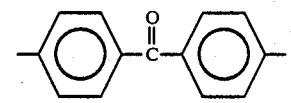

and repeating units [II] of

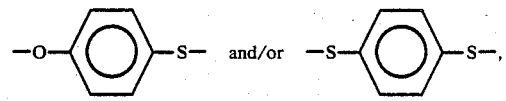

the repeating units [I] and [II] are bonded alternately, and the polymer has an intrinsic viscosity of at least 0.4, has excellent properties, particularly heat resistance, and can be used as shaped articles, coatings, films, fibers, etc.

31 Claims, 10 Drawing Sheets $2\theta$ (°)

WAVE NUMBER (cm$^{-1}$)

(ppm) TMS BASIS

2θ (°)

WAVE NUMBER (cm⁻¹)

CRYSTALLINE AROMATIC POLYKETONE AND PROCESS FOR PRODUCING THE SAME

BACKGROUND OF THE INVENTION

This invention relates to crystalline aromatic polyketones having thioether groups and a process for producing the same. More particularly, this invention relates to crystalline aromatic polyketones having a chemical structure comprising phenylene groups bonded via an ether group, a thioether group and a ketone group, or via a thioether group and a ketone group, and having excellent heat resistance, fire retardant properties, solvent resistance, mechanical properties, thermoplastic moldability, and the like, and a process for industrially producing the same.

As polymers having a structure comprising phenylene groups bonded via an ether group and a ketone group, there have been known polymers having repeating units of the formula:

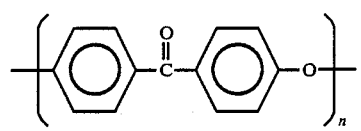

(1)

and repeating units of the formula:

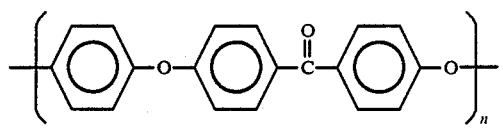

(2)

Since these polymers are excellent heat resistance, molding stability and mechanical strength, they have been regarded as useful for molding materials.

These polymers have a defect in that their starting materials are difficult to obtain, so that there has not been known a process suitable for producing these polymers on a large scale.

For example, high molecular-weight aromatic polyetherketones having repeating units of the formula (2) are produced by a condensation reaction of a dihalobenzophenone and hydroquinone. In order to produce polymers having practically usable physical and chemical properties, it is necessary to use difluorobenzophenone as the dihalobenzophenone (e.g. U.S. Pat. No. 4,320,224), which inevitably results in making the raw material cost high.

There is also known a process for producing polyetherthioethers from an alkali metal salt of hydroxythiophenol and an aromatic dihalide such as dichlorodiphenylsulfone (British Patent No. 1,295,584), but the resulting polymer is amorphous due to an internal structure of irregular arrangement of repeating units and not always satisfactory as to heat resistance, solvent resistance and mechanical properties.

There is also proposed a process for producing polyethers or polythioethers from a compound having two —XH groups (wherein X is an oxygen atom or a sulfur atom) and a dihalobenzenoid compound in the presence of potassium carbonate (British Patent No. 1,264,900). But the polymerization temperature is low and no crystalline polymer is obtained according to this process like the above-mentioned case.

On the other hand, as polymers having a structure comprising phenylene groups bonded via a thioether group, there has been known a polyphenylenesulfide having repeating units of the formula:

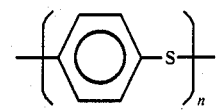

(3)

obtained by reacting, for example, dichlorobenzene and sodium sulfide (U.S. Pat. No. 3,919,177).

This polyphenylenesulfide has properties such as excellent fire retardant properties, low moisture absorption properties, high dimensional stability, good affinity to an inorganic filler and high mixing concentration of the filler. But since this polyphenylenesulfide has a glass transition temperature (Tg) of as low as 80° C., the heat distortion temperature (HDT) is low when no glass fiber is filled and thus there is a problem with regard to heat resistance. Further, since the crystalline melting point (Tm) of this polymer is relatively low as at about 281° C., the applications of this polymer as a heat resistant polymer are limited.

Therefore, the development of these kinds of polymers having a higher crystalline melting point has been desired.

In order to make the melting point of these kinds of polymers higher, there have been proposed various processes. For example, it is proposed to introduce units of the formula:

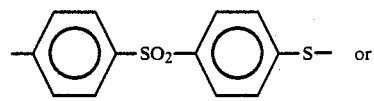 or

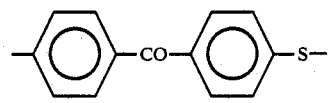

between linkages of

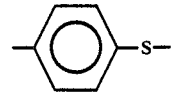

(U.S. Pat. No. 4,286,018). But the resulting polymer has a defect in that the crystallinity is lowered to deteriorate the heat resistant and mechanical properties compared with the homopolymer, when the content of the unit of the formula:

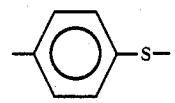

is 90% by mole or less.

As polymers obtained by regularly introducing ketone groups into polyphenylenesulfides, there are known polymers having repeating units of the formula:

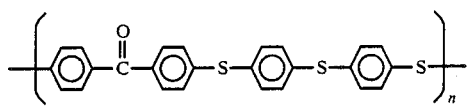

and repeating units of the formula:

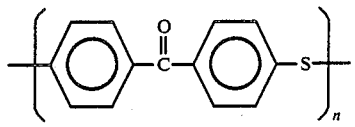

But the polymer having the repeating units of the formula (4) melts at 220° to 230° C. (U.S. Pat. No. 3,432,468) and is insufficient in heat resistance. On the other hand, the polymer having the repeating units of the formula (5) has a Tm as high as 352° C., but there is a problem in that the resulting film is brittle (British Patent No. 1,368,967).

As mentioned above, polymers having improved heat resistance by enhancing Tg and Tm without losing the excellent properties of polyphenylenesulfides have not been discovered.

These polymers such as those having repeating units of the formula (4) are generally obtained by reacting dipotassium salt of 4,4′-disulfhydryldiphenylsulfide and 4,4′-dibromobenzophenone at a temperature of 130° to 150° C. But under such low temperature polymerization conditions, since a low molecular-weight polymer is deposited at an initial stage of the polymerization, it is very difficult to obtain the desired highly crystalline high molecular weight polymer. Further, such a process has another disadvantage in using a raw material very difficult to obtain. In the case of polymers having repeating units of the formula (5), 4-chloro-4′-mercaptobenzophenone (which is very difficult to obtain) is used as a raw material.

On the other hand, there is also known a process for producing these crystalline aromatic polyketones by Friedel-Crafts polymerization. In such a case, when the polymerization is carried out in a conventional organic solvent, polymers having a low molecular weight can only be obtained.

For example, diphenyl ether and terephthaloyl chloride are polymerized in a solvent of nitrobenzene using aluminum trichloride as a catalyst to give a low molecular weight polymer having an inherent viscosity of 0.13 (U.S. Pat. No. 3,065,205).

But the use of anhydrous hydrogen fluoride as a solvent makes it possible to produce a polymer having a high inherent viscosity for the first time. That is, a high molecular weight crystalline polyketone is obtained by using anhydrous hydrogen fluoride as a solvent and boron trifluoride as a catalyst (U.S. Pat. No. 3,442,857).

In addition, the crystalline aromatic polyketones having the repeating units of the formula (1) produced by Friedel-Crafts polymerization are lower in modulus at a temperature of about 200° C. to about 350° C. and smaller in both the heat of crystallization and the heat of fusion than the polymers having repeating units of the formula (1) polymerized by polycondensation with nucleophilic substitution. Further, nuclear magnetic resonance spectra show that the polymer obtained by Friedel-Crafts polymerization has spectra due to ortho- and/or meta-position arrangement in addition to para-position arrangement. Therefore, the polymer obtained by Friedel-Crafts polymerization is low in crystallinity due to the different structure of ortho and/or meta substitution and is lowered in modulus (Japanese Patent Unexamined Publication No. 155228/85).

The same example can be seen in aromatic polysulfones obtained by Friedel-Crafts polymerization. That is, in the polymer obtained from diphenyl ether and 4,4′-bis(chlorosulfonyl)diphenyl ether, about 20% of ortho orientation (that is, different bonding) is present [Polymer 6, 589 (1965)].

As mentioned above, it is very difficult to obtain polymers having uniform structure, a high melting point and high crystallinity by the Friedel-Crafts polymerization.

On the other hand, there has been known no process for producing crystalline aromatic polythioetherketones by using easily available raw materials and simple process steps, and even if crystalline aromatic polythioetherketones are produced, they cannot be used practically as a heat resistant polymer material due to their low molecular weights.

SUMMARY OF THE INVENTION

Accordingly, it is an object of the present invention to provide a crystalline, high molecular-weight, linear polymer substantially having repeating units of the formulae:

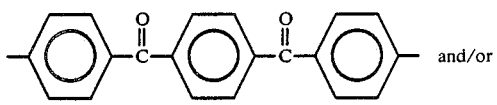 and/or

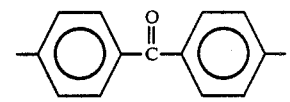

and repeating units of the formulae:

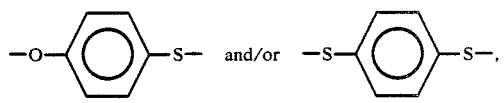

alternately, with excellent heat resistance, while retaining the properties of thioether groups such as fire retardant properties, low moisture absorption properties, dimensional stability, and good affinity to inorganic fillers.

It is another objet of the present invention to provide a process for producing such a crystalline linear polymer by using readily available raw materials with simple procedures.

The present invention provides a crystalline aromatic polyketone having a linear polymer structure substantially comprising repeating units [I] of the formulae:

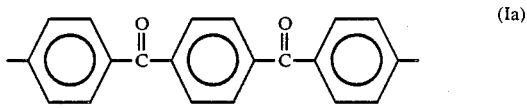 (Ia)

and/or

-continued

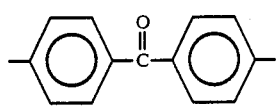 (Ib)

and repeating units [II] of the formulae:

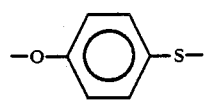 (IIa)

and/or

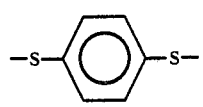 (IIb)

the repeating unit [I] and the repeating unit [II] being bonded alternately, and the polymer having an intrinsic viscosity of 0.4 or more.

This invention also provides a process for producing the crystalline aromatic polyketone mentioned above comprising polycondensing a 4,4'-dihaloterephthalophenone and/or 4,4'-dihalobenzophenone and 4-hydroxythiophenol and/or p-dimercaptobenzene in the presence of an alkali, or polycondensing a 4,4'-dihaloterephthalophenone and/or 4,4'-dihalobenzophenone and an alkali metal salt of 4-hydroxythiophenol and/or an alkali metal salt of p-dimercaptobenzene, using an aromatic ketone or an aromatic sulfone as a solvent.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
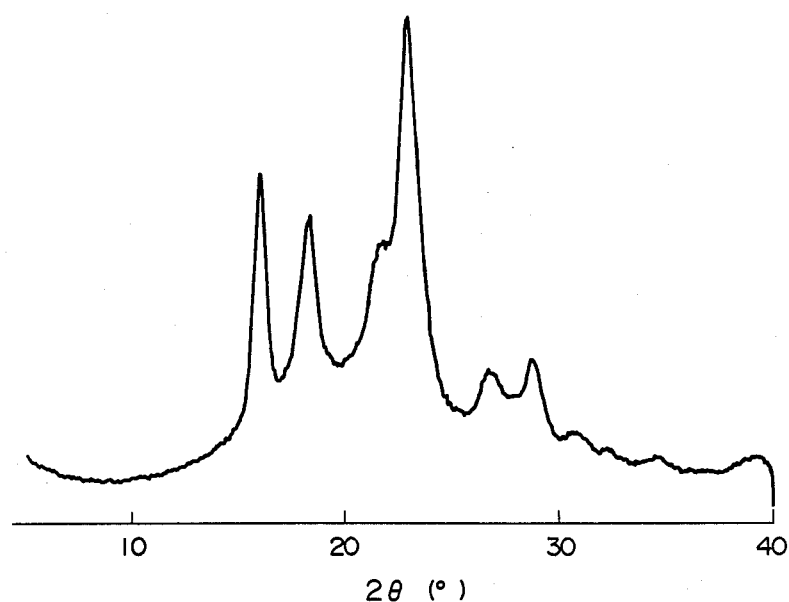
FIGS. 1, 3, 5, 7, 10, 11, 12, 14, 16, and 18 are X-ray diffraction charts of polymers obtained in Examples of this invention.

The crystalline aromatic polyketones of this invention are polymers and copolymers having a linear polymer structure comprising repeating units [I] of the formulae:

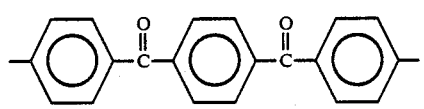 (Ia)

and/or

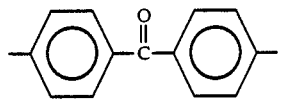 (Ib)

and repeating units [II] of the formulae:

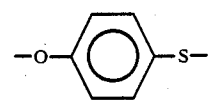 (IIa)

and/or

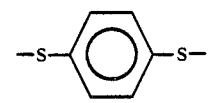 (IIb)

the repeating unit [I] and the repeating unit [II] being bonded alternately.

Compounds which can constitute the repeating unit of the formula (Ia) are, for example, those having as substituents halogen atoms such as fluorine, chlorine, bromine and iodine, and a nitro group at the 4 and 4' positions of terephthalophenone as groups to be eliminated.

Compounds which can constitute the repeating unit of the formula (Ib) are, for example, those having as substituents the same groups to be eliminated as mentioned above at the 4 and 4' positions of benzophenone.

Compounds which can constitute the repeating unit of the formula (IIa) are, for example, 4-hydroxythiophenol, an alkali metal salt thereof, a 4-trialkylsiloxy-4'-trialkylthiosiloxybenzene, etc.

Compounds which can constitute the repeating unit of the formula (IIb) are, for example, p-dimercaptobenzene, an alkali metal salt thereof, a p-bis(trialkylthiosiloxy)benzene, etc.

The compounds mentioned above constituting individual repeating units are not limitative, and any compounds which can form the repeating units in the polymer as a result of reactions can be used in this invention.

Specific examples of the "polymer" in this invention are as follows:
Polymer [A]—repeating units (Ia) and repeating units (IIa) are bonded alternately.
Polymer [B]—repeating units (Ia) and repeating units (IIb) are bonded alternately.
Polymer [C]—repeating units (Ib) and repeating units (IIa) are bonded alternately.
Polymer [D]—repeating units (Ib) and repeating units (IIb) are bonded alternately.

Specific examples of the "copolymer" in this invention are as follows:
Copolymer [E]—repeating units (Ia) (1-99 mole %) and (Ib) (99-1 mole %) and repeating units (IIa) are bonded alternately.
Copolymer [F]—repeating units (Ia) (1-99 mole %) and (Ib) (99-1 mole %) and repeating units (IIb) are bonded alternately.
Copolymer [G]—repeating units (Ia) and repeating units (IIa) (1-99 mole %) and (IIb) (99-1 mole %) are bonded alternately.

Copolymer [H]—repeating units (Ib) and repeating units (IIa) (1–99 mole %) and (IIb) (99–1 mole %) are bonded alternately.

Copolymer [J]—repeating units (Ia) (1–99 mole %) and (Ib) (99–1 mole %) and repeating units (IIa) (1–99 mole %) and (IIb) (99–1 mole %) are bonded alternately.

In the case of the polymers [A] and [C] and the copolymer [E] wherein the repeating unit (IIa) is included, there can be formed the following two units based on the bonding form for the repeating unit [I]:

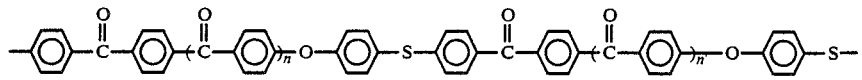

wherein n and n' are zero or an integer of 1,

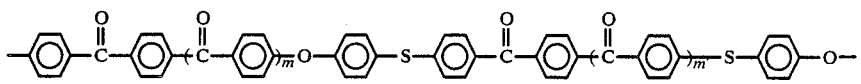

wherein m and m' are zero or an integer of 1. The polymer can include either one or both of the above-mentioned units. As to the melting point, the polymer including the former units preferably has in general a higher melting point, but as to the crystallinity, the difference in the polymer including only one kind of unit and the polymer including both kinds of units is small.

In the case of the copolymers [G], [H] and [J], the distribution of the repeating units (IIa) and (IIb) alternately bonded to the repeating units [I] [(Ia) or (Ib) or both (Ia) and (Ib)] can be present in the polymers in random, block and alternating sequence.

In the case of the copolymers [E], [F] and [J], the distribution of the repeating units (Ia) and (Ib) alternately bonded to the repeating units [II] [(IIa) or (IIb) or both (IIa) and (IIb)] can be present in the polymers in random, block and alternating sequence.

The polymers of this invention, irrespective of "polymers" and "copolymers", are crystalline.

Generally speaking, in the case of the copolymerization of monomers which can produce crystalline polymers when polymerized alone, the resulting copolymer becomes amorphous in some range of composition. But, it is a unique aspect in this invention that all the polymers and copolymers are crystalline regardless of their composition.

Among the polymers [A], [B], [C] and [D], the polymers [B], [D] and [A] (in the case of [A], including all the bonding form of the repeating units (IIa) to the repeating units (Ia)) are higher in the degree of crystallinity, and the polymers [A] and [B] are particularly high in the degree of crystallinity.

Among the copolymers [E], [F], [G], [H] and [J], the copolymers [G], [F] and [E] are higher in the degree of crystallinity, and the copolymers [G] and [F] are particularly high in the degree of crystallinity. Particularly preferable ones with a high degree of crystallinity are the copolymer [F] having (Ia) in an amount of 40 mole % or more, and the copolymer [G] having (IIa) in an amount of 70 mole % or more or 40 mole % or less (together with a high crystallization rate).

In the case of the copolymer [E], the degree of crystallinity becomes high with an increase of the content of (Ia) in the repeating units [I]. A preferable one is that having (Ia) in an amount of 50 mole % or more and belonging to Group I because of the higher degree of crystallinity.

In the case of the copolymer [H], the degree of crystallinity is high when the molar ratio of (IIa) to (IIb) in the repeating units [II] is 35:65 or less and 65:35 or more.

As to the crystalline melting point, the polymers [A] and [B] and the copolymer [G] including the repeating units (Ia) and the repeating units [II] are higher than the polymers [C] and [D] and the copolymer [H] including the repeating units (Ib) and copolymer [H] including the repeating units (Ib) and the repeating units [II].

In the copolymers [E] and [F], there is a tendency to increase the crystalline melting point with an increase of the content of (Ia) in the repeating units [I].

In the case of copolymers [G] and [H], the change of the crystalline melting point depending on the contents of (IIa) and (IIb) in the repeating units [II] is small.

As mentioned above, it is possible in this invention to produce polymers and copolymers having the desired degree of crystallinity and the desired crystalline melting point by variously combining the repeating units [I] and the repeating units [II].

In case of usual polymers the melting points are lowered when the molecular weight is not sufficiently high or a branched structure is present. But in this invention, the polymers and the copolymers are linear and have a high molecular weight, so that the melting point is 330° C. or more in the case of polymer [B], and 280° C. or more in the case of the polymer [D].

The polymers and copolymers of this invention should have an intrinsic viscosity of 0.4 or more, preferably 0.4 to 1.8. When the intrinsic viscosity is less than 0.4, the polymers and copolymers become brittle and are not suitable for films and injection molded articles. On the other hand, when the intrinsic viscosity is more than 1.8, there is a tendency that the viscosity of molten polymers and copolymers increases excessively, which results in making it difficult to mold them.

The polymers [A] and [C] and copolymer [E] have a slow crystallization rate, so that they are advantageous for producing films. On the other hand, the polymers [B] and [D] and copolymer [F] have a fast crystallization rate, so that they are suitable for injection molding.

Articles obtained from the polymers and copolymers of this invention have excellent heat resistance. The heat resistance can be evaluated by the weight loss by heating. The temperature necessary for losing 5% by weight in air is 50 to 70° C. higher than that of known polyphenylenesulfides. Among the polymers of this invention, the polymer [A] shows the higher value than the polymers [B], [C] and [D].

The polymers and copolymers of this invention are superior in fire retardant properties to known aromatic polyetherketones as shown in Example 33 mentioned below, and equal to or superior to known polyphenylenesulfides having excellent fire retardant properties. The polymers [B] and [D] and copolymer [F] are slightly better than the polymers [A] and [C] and copolymer [E] regarding the fire retardant properties.

It is also characteristic that the polymers and copolymers of this invention have good flow properties. For example, the polymer [A] exhibits better flow properties compared with known aromatic polyetherketones having almost the same intrinsic viscosity. This means that the polymers and copolymers of this invention have advantages of lowering the molding pressure and the molding temperature at the time of practical molding. In other words, the polymers and copolymers of this invention can have higher molecular weight at the same level of flow properties, which results in making it possible to improve mechanical properties such as impact strength, and the like.

X-ray diffraction measurement shows that the polymers and copolymers of the present invention can be divided into two groups depending on patterns of X-ray diffraction charts, when the values of $2\theta$ from the first to third intensities of the diffraction chart are taken into consideration.

Group 1: 23.0±0.3, 18.5±0.3, 16.6±0.6
Group 2: 18.7±0.2, 23.0±1.0, 20.7±0.3

In group 1, the peak at 16.6±0.6 is characteristic and the peak at 20.7±0.3 is characteristic in group 2.

Group 1 includes the polymers [A], [B], [D] and copolymers [G], [F], [H] (wherein the ratio of (IIb) in the repeating units [II] is predominant) and [E] (wherein the ratio of (Ia) in the repeating units [I] is predominant).

Group 2 includes the polymer [C] and the copolymers [H] (wherein the ratio of (IIb) in the repeating units [II] is minor) and [E] (wherein the ratio of (Ib) in the repeating units [I] is major).

Some of the copolymers [H] and [E] show peaks characteristic to both of the groups 1 and 2.

In contrast, the X-ray diffraction pattern of known aromatic polyetherketones belongs to the group 2. Therefore, the X-ray diffraction pattern of group 1 is characteristic to the aromatic polyketones containing thioether groups.

The correspondence of these X-ray diffraction patterns and properties of the polymers and copolymers of this invention is not clear, but the correspondence of portions belonging to the group 1 to portions high in the degree of crystallinity seems to be good.

The crystalline aromatic polyketones of this invention can be produced by polycondensation of monomers corresponding to the repeating units [I] and [II] in the presence of an alkali using an aromatic ketone or an aromatic sulfone as a solvent.

As the monomers, there can be used 4-hydroxythiophenol or an alkali metal (Na, K, Li, etc.) salt thereof, p-dimercaptobenzene or an alkali metal salt thereof, 4,4'-dihaloterephthalophenone of the formula:

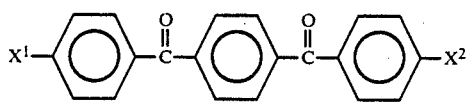
(6)

wherein $X^1$ and $X^2$ are, different or the same, halogen atoms, or 4,4'-dihalobenzophenone of the formula:

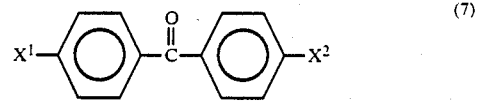
(7)

wherein $X^1$ and $X^2$ are as defined above.

The alkali metal salts of 4-hydroxythiophenol and p-dimercaptobenzene can be obtained by a conventional process, for example, by reacting an alkali metal hydroxide with 4-hydroxythiophenol or p-dimercaptobenzene.

Examples of the 4,4'-dihaloterephthalophenone are 4,4'-dichloroterephthalophenone, 4,4'-difluoroterephthalophenone, 4-chloro-4'-fluoroterephthalophenone, and the like. These compounds can be used alone or as a mixture thereof.

Examples of the 4,4'-dihalobenzophenone are 4,4'-dichlorobenzophenone, 4,4'-difluorobenzophenone, 4-chloro-4'-fluorobenzophenone, and the like. These compounds can be used alone or as a mixture thereof.

In this invention, it is not necessary to use fluorine compounds (which are usually difficult to to obtain, as the starting materials. Even if compounds wherein both $X^1$ and $X^2$ are chlorine in the formulae (6) and (7) (which are easy to obtain) are used, polymers having a high molecular weight can be obtained by a polymerization time not so different from the case of using the fluorine compound.

There is no special difference in heat resistance generally required, even if polymers or copolymers are obtained by using a monomer wherein both $X^1$ and $X^2$ are chlorine or wherein both $X^1$ and $X^2$ are fluorine. But when heat resistance for a long period of time under severe conditions is required, the use of a polymer obtained by using a fluorine compound is preferable due to better heat resistance attained.

The 4,4'-dihaloterephthalophenone and/or 4,4'-dihalobenzophenone and 4-hydroxythiophenol and/or p-dimercaptobenzene are preferably used in substantially equimolar amounts, and more specifically 0.95 to 1.20 moles of 4-hydroxythiophenol and/or p-dimercaptobenzene per mole of 4,4'-dihaloterephthalophenone and/or 4,4'-dihalobenzophenone. When the monomers are used outside the abovementioned range, it is difficult to obtain the desired high molecular weight polymers and copolymers.

Particularly when p-dimercaptobenzene is used, it is preferably used in slight excess, such as 1.01 to 1.15 moles to give a polymer having a high molecular weight. But, in this case, in order to reduce the amount of thermally unstable terminal mercapto groups, it is preferable to replace the terminal mercapto groups by thermally stable alkyl, aromatic halogen or aromatic groups.

In the case of using 4-hydroxythiophenol, it is preferable to use it in an amount of 0.95 to 1.00 mole in order to make the terminal groups thermally stable aromatic halide units.

As the solvent for the polycondensation, there is used an aromatic ketone or aromatic sulfone.

As the aromatic ketone, there can be used benzophenone compounds of the formula:

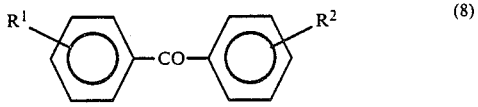

(8)

where $R^1$ and $R^2$ are independently a hydrogen atom, an alkyl group having 1 to 3 carbon atoms, or a phenyl group, provided that when $R^1$ or $R^2$ is a phenyl group, the phenyl group can be fused with a benzene ring of the benzophenone skelton.

Examples of the benzophenone compound of the formula (8) are benzophenone, 4-methylbenzophenone, 4-phenylbenzophenone, naphthylphenylketone, 4,4'-dimethylbenzophenone, etc. Among them, the use of benzophenone is preferable from the viewpoint of thermal stability and availability.

It is possible to use as the aromatic ketone xanthone compounds and thioxanthone compounds of the formula:

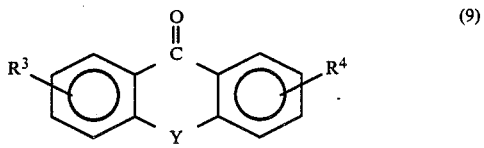

(9)

wherein $R^3$ and $R^4$ are independently a hydrogen atom, an alkyl group having 1 to 3 carbon atoms, or a phenyl group; and Y is an oxygen atom or a sulfur atom.

Examples of the xanthone and thioxanthone compounds of the formula (9) are xanthone, 2-methylxanthone, 2-phenylxanthone, thioxanthone, 2-methylthioxanthone, 2-phenylthioxanthone, etc. Among them, xanthone and thioxanthone are preferable.

In addition, 4-phenyoxybenzophenone, terephthalophenone, isophthalophenone, etc., can also be used as the aromatic ketone.

As the aromatic sulfone, there can be used those represented by the formulae:

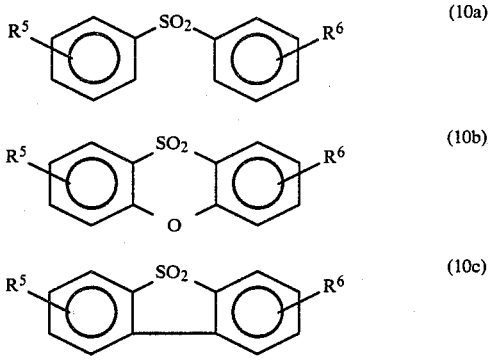

(10a)

(10b)

(10c)

wherein $R^5$ and $R^6$ are independently a hydrogen atom, an alkyl group having 1 to 3 carbon atoms or a phenyl group.

Examples of the aromatic sulfone are diphenyl-sulfone, ditolylsulfone, dibenzothiophene oxide, phenoxanthine dioxide, 4-phenylsulfonylbiphenyl, etc.

Among these solvents, the use of aromatic ketones is preferable in order to obtain highly crystalline polymers having a high molecular weight and thermal stability compared with aromatic sulfones. The reason seems to be that the aromatic ketones have excellent solubility for the polymer or copolymer produced. Further, the aromatic ketones have no oxidizing properties as is clear from the structure, so that there is no fear of oxidizing monomers of thiophenols and thus a polymer having a nonuniform structure such as branching is hardly produced. Particularly when highly oxidizable p-dimercaptobenzene is used in a larger proportion, the use of an aromatic ketone as the solvent is preferable.

Among the aromatic ketones, benzophenone (m.p. 48° to 49° C.) can be treated as a liquid near normal temperatures compared with solvents which are solid at near normal temperature such as xanthone (m.p. 173° to 174° C.) and thioxanthone (m.p. 207° to 209° C.), and allows easy separation of the product, recovery and refining of the solvent, so that the use of benzophenone is preferable.

The solvent is usually used in an amount of preferably 10 to 1000 parts by weight, more preferably 20 to 500 parts by weight per 100 parts by weight of the total amount of the monomers, that is, 4-hydroxythiophenol and/or p-dimercaptobenzene and 4,4'-dihaloterephthalophenone and/or 4,4'-dihalobenzophenone. The use of too much solvent is not preferable from the viewpoint of polycondensation efficiency and the use of too less solvent is not preferable from the viewpoint of eliminating effects of the solvent.

The polycondensation reaction can be carried out, for example, by using substantially equimolar amounts of 4-hydroxythiophenol and/or p-dimercaptobenzene and 4,4'-dihaloterephthalophenone and/or 4,4'-dihalobenzophenone in a suitable solvent in the presence of an alkali with heating, or alternatively by heating substantially equimolar amounts of alkali metal salt(s) of 4-hydroxythiophenol and/or p-dimercaptobenzene and 4,4'-dihaloterephthalophenone and/or 4,4'-dihalobenzophenone in a suitable solvent.

Since 4-hydroxythiophenol having a free hydroxyl group and a mercapto group is more stable than its alkali metal salt, and p-dimercaptobenzene having free mercapto groups is more stable and more simple in polymerization operation than its alkali metal salt, the polycondensation using the stabler compounds in the presence of an alkali is preferable.

As the alkali, there can be used hydroxides, carbonates, bicarbonates, fluorides, hydrides, alkoxides and alkylated compounds of alkali metals. Among them, preferable ones are alkali metal carbonates and alkali metal bicarbonates. Preferable examples are sodium carbonate, potassium carbonate, rubidium carbonate, cesium carbonate, sodium bicarbonate, potassium bicarbonate, rubidium bicarbonate, cesium bicarbonate, and the like. Among them, sodium carbonate, potassium carbonate, sodium bicarbonate and potassium bicarbonate are more preferable. These alkalis may be used alone or as a mixture thereof.

The amount of the alkali metal salt used as the alkali is preferably 0.3 to 2 gram atoms in terms of the alkali metal atom per 0.5 mole of 4-hydroxythiophenol and/or p-dimercaptobenzene. The use of too much alkali metal salt is disadvantageous since it causes a too vigorous reaction and harmful side-reactions, and increases cost. Therefore the use of alkali metal salt in an amount as small as possible is preferable. But an amount of alkali metal salt of less than 0.3 gram atom is not preferable because of the need of a longer polymerization time and difficulty in obtaining a polymer having a desirable molecular weight. In the case of using a xanthone compound or a thioxanthone compound as the solvent, the use of alkali metal salt in an amount of 0.5 to 1.2 gram atom per 0.5 mole of 4-hydroxythiophenol and/or p-dimercaptobenzene is more preferable. In the case of using a benzophenone compound as the solvent, the use of alkali metal salt in an amount of 0.7 to 1.2 gram atom per 0.5 mole of 4-hydroxythiophenol and/or p-dimercaptobenzene is more preferable.

The alkali metal salt used as the alkali is preferably in the form of an anhydrous salt, but the use of a hydrated salt becomes possible by removing the water by distillation together with an azeotropic solvent from the polymerization reaction system.

The process of this invention can be carried out as follows.

In the case of using an alkali, a solvent, an alkali, a 4,4'-dihaloterephthalophenone and/or a 4,4'-dihalobenzophenone, and 4-hydroxythiophenol and/or p-dimercaptobenzene are placed in a reactor preferably under an atmosphere of an inert gas such as nitrogen, argon, or the like.

In the case of using no alkali, a solvent, 4,4'-dihaloterephthalophenone and/or 4,4'-dihalobenzophenone, and an alkali metal salt of 4-hydroxythiophenol and/or an alkali metal salt of p-dimercaptobenzene are placed in a reactor preferably under an atmosphere of an inert gas such as nitrogen, argon, or the like.

Then, the reaction mixture is heated at 200° to 400° C., preferably at 250° to 350° C., preferably under an atmosphere of inert gas such as nitrogen, argon, or the like, to conduct the polymerization reaction. When the reaction temperature is lower than 200° C., a polymer is deposited during the polymerization and no polymer having a high molecular weight can be obtained, while when the reaction temperature is higher than 400° C., coloring of the produced polymer due to deterioration becomes remarkable. Further, a rapid temperature rise is not desirable because of causing side reactions, coloring of the produced polymer, gelation, and the like. Therefore, it is necessary to raise the reaction temperature stepwise or gradually and to maintain the temperature in the polymerization system as uniform as possible.

In order to obtain a high molecular weight polymer having an intrinsic viscosity of 0.4 or more, it is necessary to make the polymerization temperature 200° C. or higher at the final stage. In order to carry out the polycondensation smoothly, it is possible to carry out a pre-polymerization at a temperature lower than 200° C.

It is preferable to remove the water produced during the polymerization from the system. As the water removing process, there can be used a process of replacing the gas phase of the polymerization system simply by a dry inert gas, a process of introducing a solvent having a lower boiling point than the polymerization solvent into the system and removing by distillation the water together with the lower boiling point solvent from the system, and the like.

The polymerization reaction can be stopped by adding to the reaction system a suitable terminator at the above-mentioned polymerization temperature. As the terminator, there can be used monofunctional or polyfunctional halogenides such as methyl chloride, tert-butyl chloride, 4,4'-dichlorodiphenylsulfone, 4,4'-difluorobenzophenone, 4,4'-difluoroterephthalophenone, 4-fluorobenzophenone, etc. Further, by this termination, there can be obtained polymers and copolymers having thermally stable alkyl groups, aromatic halogen groups, aromatic groups, or the like, at the terminals.

The thus obtained polymers and copolymers of this invention have substantially the repeating units [I] of the formula:

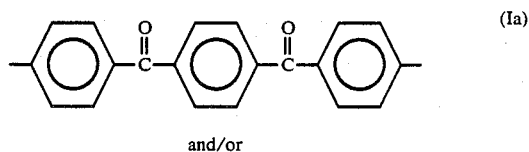

and/or

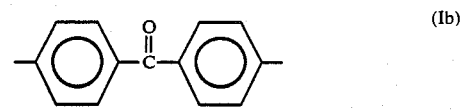

and the repeating units [II] of the formulae:

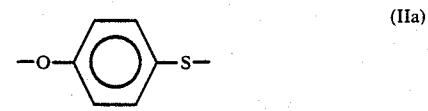

and/or

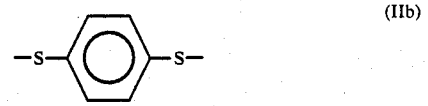

bonded alternately. For example, the crystalline polymers and copolymers of this invention can have repeating units of the formula:

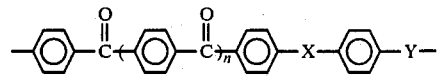

wherein n is zero or an integer of 1; X and Y are independently oxygen or sulfur, provided that when X is sulfur, y is oxygen or sulfur, while when X is oxygen, Y is sulfur.

The crystalline polymers and copolymers of this invention have a melting point of about 270° to 380° C. and a high degree of crystallinity.

Among these repeating units, the repeating unit (IIa) can form a repeating unit of the formula:

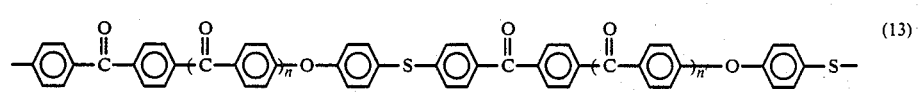

wherein n and n' are independently zero or an integer of 1, or the formula:

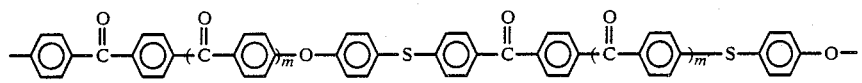 (14)

wherein m and m', are independently zero or an integer of 1, depending on the bonding forms for the repeating units. [I]. In this invention, the polymers and copolymers can contain either one of the repeating units (13) and (14) or both of them randomly or regularly. Among them, copolymers having a structure of high crystalline melting point are preferable due to the high degree of crystallinity.

When no particular control is provided to the polymerization system, a random structure having no regularity in the bonding form seems to be produced preferentially. But since the reactivity of the mercapto group is considerably higher than the hydroxyl group at low temperatures, when the polymerization is carried out at a high temperature after previous prepolymerization at a lower temperature, the repeating unit of the formula (13) is preferentially formed. On the other hand, when 1 mole of 4-hydroxythiophenol is reacted with 0.5 mole of an aromatic dihalide, followed by the reaction with 0.5 mole of the residual aromatic dihalide, the repeating unit of the formula (14) is preferentially formed.

As mentioned above, when the repeating unit [I] comprises (Ia) and (Ib), random, alternating and block bonding states in the resulting copolymers may be present depending on the distribution state of the repeating units of the formulae (Ia) and (Ib). Such distribution states can be controlled by the method of addition of 4,4'-dihaloterephthalophenone and 4,4'-dihalobenzophenone. For example, when equimolar amounts of 4-hydroxythiophenol or p-dimercaptobenzene and a mixture of the above-mentioned aromatic dihalides are charged into the reaction system at the same time and polymerized, copolymers having a random distribution of the repeating units (Ia) and the repeating units (Ib) can be obtained.

On the other hand, when equimolar amounts of 4-hydroxylthiophenol or p-dimercaptobenzene and 4,4'-dihaloterephthalophenone are reacted, followed by the reaction of equimolar amounts of 4-hydroxythiophenol or p-dimercaptobenzene and 4,4'-dihalobenzophene, copolymers having a block distribution of the repeating units (Ia) and (Ib) can be obtaied. When 2 moles of 4-hydroxythiophenol or p-dimercaptobenzene and 1 mole of 4,4'-dihaloterephthalophenone are reacted, followed by the reaction with 1 mole of 4,4'-dihalobenzophenone, copolymers having highly alternating repeating units of (Ia) and (Ib) can be obtained.

When the repeating units [II] comprises (IIa) and (IIb), random, alternating and block bonding states in the resulting copolymers are also present depending on the distribution state of the repeating units of the formulae (IIa) and (IIb).

As mentioned above, various polymers and copolymers having regularity or irregularity, and those having the desired high melting point and high degree of crystallinity can be produced by changing the combination of monomers, the polymerization temperature and the method of addition of monomers. Among them, those having relatively high regularity and high crystallinity are preferable.

The polymers and copolymers of this invention have better properties than the conventional polyphenylenesulfides and are remarkably enhanced in heat resistance.

For example, polymers having repeating units of the formula:

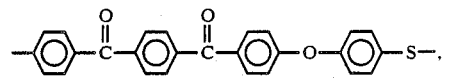

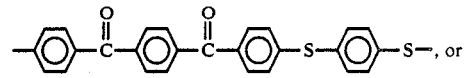

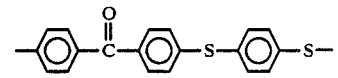

or copolymers containing these repeating units are crystalline thermoplastic resins having a high melting point, e.g. a Tg enhanced by 54° to 73° C. and a Tm enhanced by 22° to 88° C., and properties such as excellent heat resistance and fire retardant properties, high dimensional stability, low moisture absorption, good affinity to an inorganic filler, mechanical properties, and remarkable solvent resistance since they are hardly dissolved in almost all solvents at room temperature except for concentrated sulfuric acid.

The crystalline aromatic polyketone polymers and copolymers having thioether groups of this invention are suitably used as molding materials for producing articles used under severe conditions at high temperatures. Further, the polymers and copolymers of this invention have other advantages in that they have better fire retardant properties and moldability than conventional aromatic polyetherketones and they are obtained by using non-expensive aromatic dihalo compounds as starting materials. In addition, by controlling the bonding arrangement of the repeating units (Ia) and (Ib) as well as (IIa) and (IIb), polymers and copolymers having various compositions and regularity can be produced, so that polymers and copolymers having different glass transition temperatures, crystalline melting points, and crystallization rates can be obtained depending on the respective purpose.

The polymers and copolymers of this invention can be used as shaped articles, coatings, films, fibers as they are, and also used together with one or more engineering plastics, heat resistant resins, glass fibers, carbon fibers, inorganic materials and the like, for providing alloys and composite materials.

This invention is illustrated by way of the following Examples.

In this invention, since the polymers and copolymers are dissolved in only concentrated sulfuric acid and not dissolved in general organic solvents, it is difficult to measure an average molecular weight. Therefore, the intrinsic viscosity is used as a measure of the molecular weight.

In the following Examples, properties of the polymers and copolymers were measured as follows.

(1) Intrinsic Viscosity

Using concentrated sulfuric acid having a density of 1.84 g/cm³, a solution containing 0.1 g of a polymer per 100 cm³ of the solution and a solution containing 0.5 g of a polymer per 100 cm³ of the solution were prepared. Viscosities of the solutions were measured at 25° C. and the intrinsic viscosity was obtained by using the following equation:

Intrinsic viscosity = $\{(\eta_{rel}-1)/C\}_{C \to 0}$ wherein $\eta_{rel}$ is a relative viscosity, C is a concentration (g/100 ml), and C→0 means that the value of $(\eta_{rel}-1)/C$ was extrapolated into the point of concentration C being zero.

(2) Crystalline Melting Point (Tm), and Glass Transition Temperature (Tg)

Tm and Tg were measured by using a differential scanning calorimeter (DSC) with a temperature rise rate of 10° C./min. For measuring the Tm, a polymer powder obtained by the polymerization was used as it was.

EXAMPLE 1

The air in a four-necked separable flask equipped with a stirrer, a nitrogen introducing pipe and a condenser was replaced by nitrogen, and 13.14 g (0.0408 mole) of 4,4'-difluoroterephthalophenone, 5.04 g (0.040 mole) of 4-hydroxythiophenol, and 40 g of benzophenone were placed in the flask and heated under a nitrogen atmosphere. After adding 5.52 g (0.040 mole) of anhydrous potassium carbonate at 120° C., the temperature was raised to 305° C. in one hour and maintained at that temperature for 3 hours to produce a viscous reaction solution. The reaction was carried out from the beginning under an atmospheric pressure. Subsequently, 4.0 g of 4,4'-difluoroterephthalophenone was added at that temperature, which temperature was maintained for 30 minutes. The reaction solution was cooled and a solid product was separated, pulverized and washed with warm acetone twice, warm water twice and warm acetone once to give a polymer in 96% yield. This polymer was crystalline and had an intrinsic viscosity of 1.10, Tm of 355° C. and Tg of 152° C.

The polymer had an alternating structure of the repeating units of the formulae:

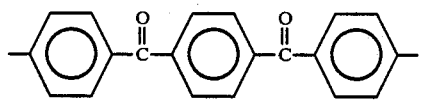

(Ia)

and

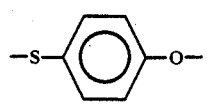

(IIa)

The polymer was made into a film by using a press at 400° C. and maintained at that temperature for 30 minutes. The film had an intrinsic viscosity of 1.10, which value was not changed. This means that the polymer is very stable thermally.

The polymer was not dissolved in a solvent selected from methylene chloride, chloroform, N,N-dimethylformamide, sulfolane, dimethylsulfoxide, hexamethylphosphorictriamide, hexane or toluene at room temperature.

Figure 2:
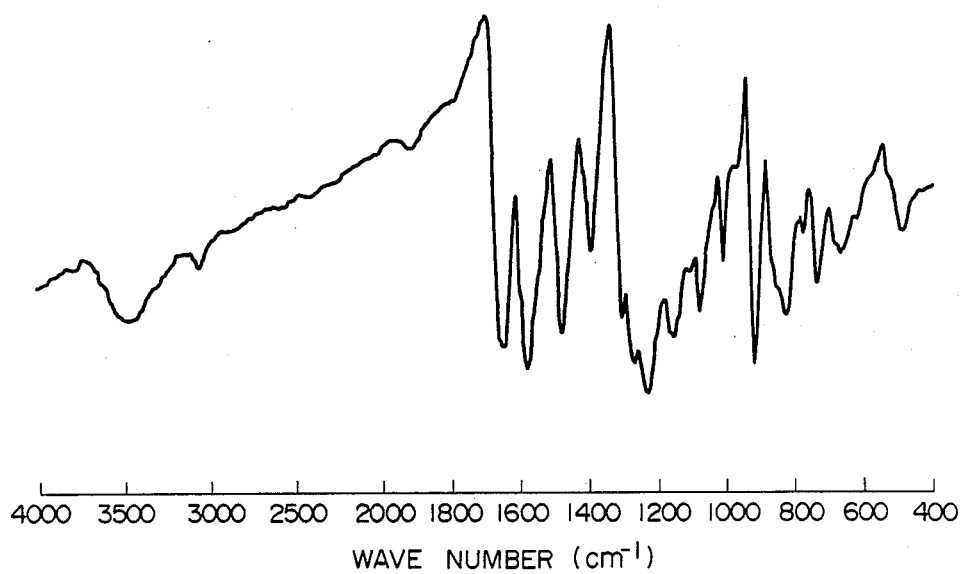
FIGS. 2, 4, 6, 8, 13, 15, 17 and 19 are infrared spectra of polymers obtained in the Examples of this invention.

An X-ray diffraction chart and IR analysis chart of the polymer are shown in FIGS. 1 and 2, respectively. For the X-ray diffraction analysis and IR analysis, there was used the polymer powder obtained by the polymerization as it was.

Elementary analysis of the polymer was as follows:

|  | C (%) | H (%) | O (%) | S (%) |
|---|---|---|---|---|
| Found | 76.6 | 4.0 | 11.6 | 7.7 |
| Calculated | 76.46 | 3.94 | 11.75 | 7.85 |

The film obtained by pressing the polymer at 360° C. for 5 minutes was remarkably tough and strong against repeated folding and had a tensile strength of 920 kg/cm² and elongation at break of 90% (measured according to ASTM D882).

EXAMPLE 2

The process of Example 1 was repeated except for using 14.48 g (0.0408 mole) of 4,4'-dichloroterephthalophenone, 5.04 g (0.040 mole) of 4-hydroxythiophenol, 5.52 g (0.040 mole) of anhydrous potassium carbonate and 40 g of benzophenone, adding the anhydrous potassium carbonate from the beginning and carrying out the last stage of the reaction at 300° C. for 4 hours.

The resulting polymer was crystalline and had an intrinsic viscosity of 0.80, Tm of 345° C. and Tg of 151° C.

When the polymer was pressed at 400° C. for 5 minutes, there was obtained a tough film strong in folding.

EXAMPLE 3

The air in a four-necked separable flask equipped with a stirrer, a nitrogen introducing pipe, and a condenser was replaced by nitrogen, and 14.20 g (0.040 mole) of 4,4'-dichloroterephthalophenone, 5.04 g (0.040 mole) of 4-hydroxythiophenol, 5.52 g (0.040 mole) of anhydrous potassium carbonate and 40 g of xanthone were placed in the flask and heated under a nitrogen atmosphere. The temperature was raised to 280° C. in one hour, raised from 280° C. to 310° C. in one hour and maintained at 310° to 320° C. for 2 hours to give a viscous reaction solution. The reaction was carried out from the beginning under atmospheric pressure. Then, 4.0 g of dichlorodiphenylsulfone was added at that temperature to stabilize the terminals, followed by cooling and addition of water. The resulting solid product was pulverized, washed with warm acetone twice, warm water twice and acetone once to give 16.3 g of a white solid. The obtained polymer was crystalline and had an intrinsic viscosity of 0.86, Tm of 346° C. and Tg of 152° C.

When the polymer was pressed at 400° C. for 5 minutes, there was obtained a tough film strong in folding.

The polymer had a structure of alternately having the repeating units (Ia) and (IIa).

EXAMPLE 4

The air in a four-necked separable flask equipped with a stirrer, a nitrogen introducing pipe and a condenser was replaced by nitrogen, and 13.20 g (0.041 mole) of 4,4'-difluoroterephthalophenone, 5.04 g (0.040 mole) of 4-hydroxythiophenol and 40 g of xanthone were placed in the flask and heated under a nitrogen atmosphere. The temperature was raised to 150° C. and 5.52 g (0.040 mole) of anhydrous potassium carbonate was added to initiate the polymerization. The temperature was raised and then finally raised to 310° C., at which temperature the reaction was carried out for 2 hours to yield a viscous reaction solution. The reaction was carried out from the beginning under an atmospheric pressure. The reaction solution was treated in the same manner as described in Example 1 to give 16.0 g of a white solid.

The resulting polymer was crystalline and had an intrinsic viscosity of 1.1, Tm of 340° C. and Tg of 153° C.

When the polymer was pressed at 400° C. and the resulting film was mainted at that temperature for 30 minutes, the film had an intrinsic viscosity of 1.1 without any change; this means that the polymer has remarkably stable thermal stability.

EXAMPLE 5

The process of Example 3 was repeated except for using 40 g of thioxanthone in place of 40 g of xanthone to give a polymer having an intrinsic viscosity of 0.80. Even if this polymer was pressed at 400° C. for 30 minutes, the intrinsic viscosity was not changed and thermally stable.

EXAMPLE 6

Using the same apparatus as used in Example 1, 12.88 g (0.040 mole) of 4,4'-difluoroterephthalophenone, 5.04 g (0.040 mole) of 4-hydroxythiophenol, 4.42 g (0.032 mole) of anhydrous potassium carbonate and 40 g of diphenylsulfone were heated under a nitrogen atmosphere. The temperature was maintained at 150° C. for 1 hour, at 180° C. for 1 hour, at 250° C. for 1 hour and raised to 310° C., at which temperature the reaction solution was maintained for 3 hours. The reaction solution was cooled and a solid product was pulverized, washed with warm acetone twice, warm water twice and acetone once to give a solid in 95% yield.

The polymer was crystalline and had an intrinsic viscosity of 0.87, Tm of 342° C. and Tg of 154° C.

Figure 3:
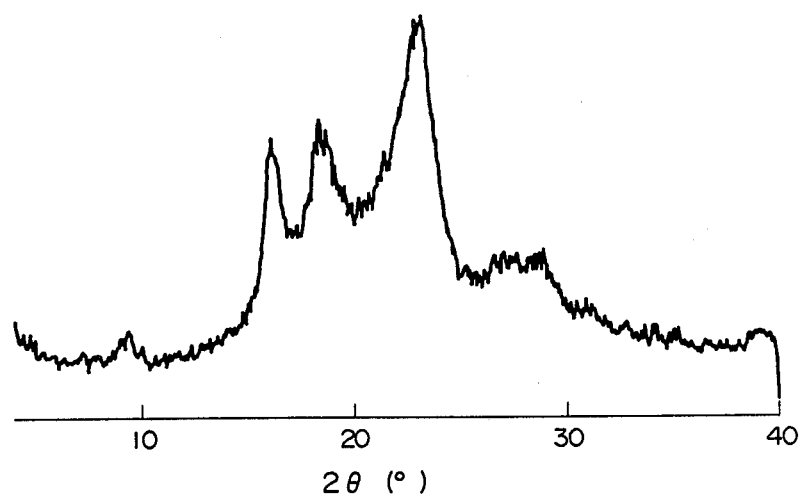
Figure 4:
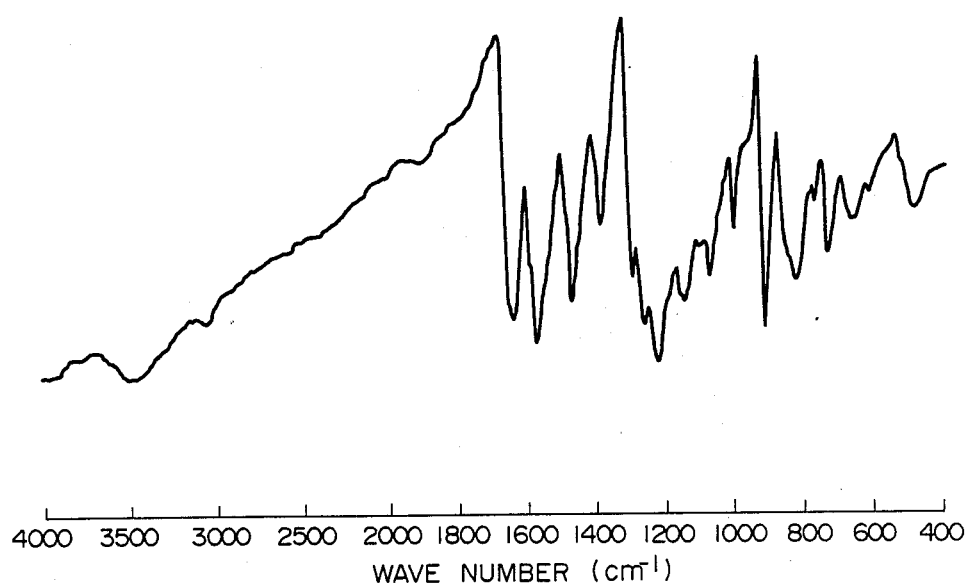

X-ray diffraction chart and IR analysis chart of the polymer are shown in FIGS. 3 and 4, respectively. For the X-ray diffraction and IR analysis, there was used the polymer powder obtained by the polymerization as it was.

When the polymer was pressed at 380° C. for 5 minutes, the resulting film was very tough and strong against repeated folding and had a tensile strength of 910 kg/cm² and elongation at break of 80% measured according to ASTM D882.

EXAMPLE 7

Using the same apparatus as used in Example 1, 6.44 g (0.020 mole) of 4,4'-difluoroterephthalophenone, 5.04 g (0.040 mole) of 4-hydroxythiophenol, 2.12 g (0.020 mole) of anhydrous sodium carbonate, 40 g of xanthone ahd 10 ml of toluene were heated under a nitrogen atmosphere. The temperature was maintained at the reflux temperature of toluene for 1 hour and the water produced was removed with the toluene azeotropically. The temperature was maintained at 150° C. for 1 hour, and at 200° C. for 1 hour. After cooling, 6.44 g (0.020 mole) of 4,4'-difluoroterephthalophenone, 2.12 g (0.020 mole) of anhydrous sodium carbonate and 10 ml of toluene were added to the reaction mixture and maintained at the reflux temperature of toluene for 1 hour to remove the water produced and toluene azeotropically. The temperature was maintained at 150° C. for 1 hour, at 180° C. for 1 hour and at 300° C. for 2 hours. After cooling, a solid was yielded in 94% by the same treatment as in Example 1.

The resulting polymer had an intrinsic viscosity of 1.1, Tm of 324° C. and Tg of 152° C. and was crystalline.

EXAMPLE 8

The air in a four-necked separable flask equipped with a stirrer, a nitrogen introducing pipe and a condenser was replaced by nitrogen, and 16.10 g (0.050 mole) of 4,4'-difluoroterephthalophenone, 7.24 g (0.051 mole) of p-dimercaptobenzene, 6.90 g (0.050 mole) of anhydrous potassium carbonate and 40 g of xanthone were placed in the flask and heated under a nitrogen atmosphere. The temperature was raised to 320° C. in one hour and maintained at that temperature for 3 hours. Then, methyl chloride was blown into the reaction system at that temperature for 20 minutes. After cooling, the resulting solid was pulverized, washed with warm acetone twice, warm water twice and warm acetone once to give a polymer in 94% yield.

The polymer was crystalline and had an intrinsic viscosity of 0.98, Tm of 369° C., Tg of 141° C., and repeating units of the formula:

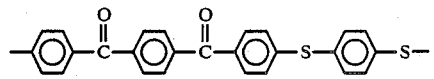

The polymer was not dissolved in a solvent selected from methylene chloride, chloroform, N,N-dimethylformamide, sulfolane, dimethylsulfoxide, hexamethylphosphorictriamide, hexane or toluene at room temperature. Elementary analysis of the polymer was as follows:

|  | C (%) | H (%) | O (%) | S (%) |
|---|---|---|---|---|
| Found | 73.5 | 3.8 | 7.5 | 15.0 |
| Calculated | 73.56 | 3.80 | 7.54 | 15.11 |

Figure 5:
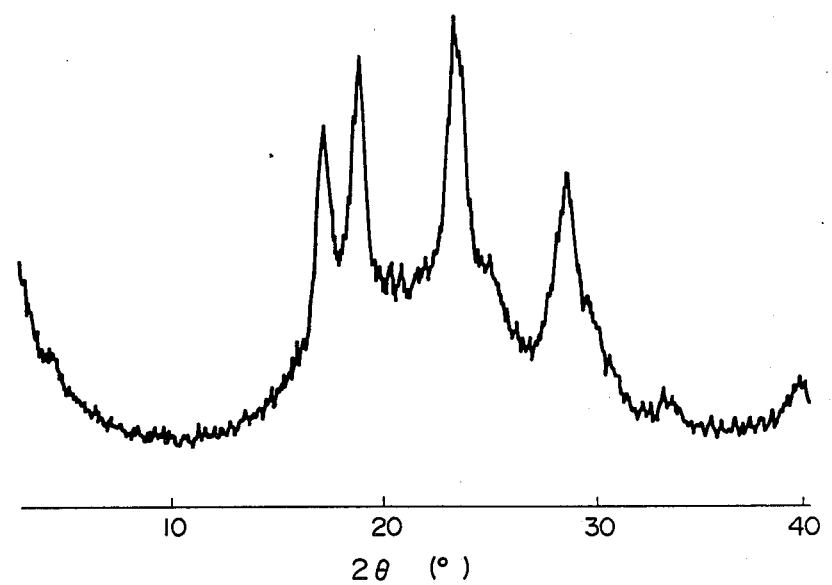
Figure 6:
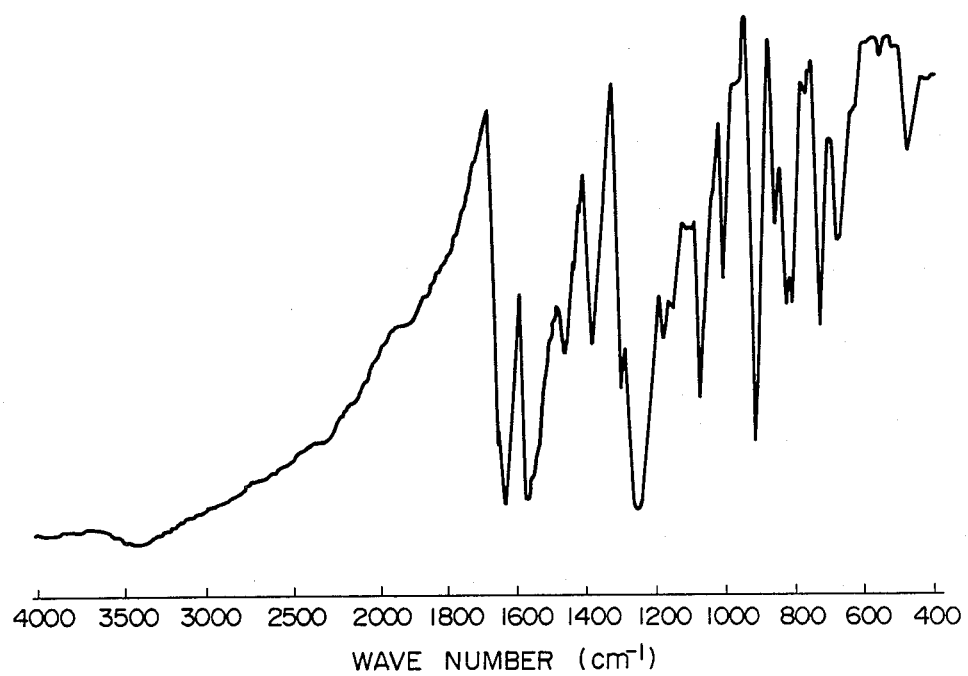

An X-ray diffraction chart and IR analysis chart of the polymer are shown in FIGS. 5 and 6, respectively. For the X-ray diffraction and IR analysis, there was used the polymer powder obtained by the polymerization as it was.

When the polymer was pressed at 400° C. for 5 minutes, the resulting film had a tensile strength of 870 kg/cm² and elongation at break of 40% measured according to ASTM D882.

EXAMPLE 9

The process of Example 1 was repeated except for using 14.20 g (0.040 mole) of 4,4'-dichloroterephthalophenone, 5.68 g (0.040 mole) of p-dimercaptobenzene, 5.52 g (0.040 mole) of anhydrous potassium carbonate, and 40 g of benzophenone and carrying out the last stage of the reaction at 305° C. for 4 hours to produce a polymer.

The polymer was crystalline and had an intrinsic viscosity of 0.85, Tm of 367° C. and Tg of 141° C.

When the polymer was pressed at 400° C. for 5 minutes, the resulting film was tough and strong against repeated folding.

The resulting polymer had alternately bonded repeating units of (Ia) and (IIb) of the formula:

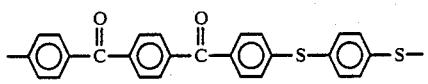

EXAMPLE 10

The air in a four-necked separable flask equipped with a stirrer, a nitrogen introducing pipe, and a condenser, was replaced by nitrogen and 15.26 g (0.070 mole) of 4,4'-difluorobenzophenone, 10.70 g (0.0753 mole) of p-dimercaptobenzene, 9.66 g (0.070 mole) of anhydrous potassium carbonate, and 50 g of xanthone were placed in the flask and heated under a nitrogen atmosphere. The temperature was raised to 250° C. in 3 hours, and to 320° C. in one hour and maintained at that temperature for 2 hours. Then, methyl chloride was blown into the reaction system at that temperature for 20 minutes. After cooling, a solid product was pulverized, and washed with warm acetone twice, warm water twice and warm acetone once to give 21.3 g of a polymer in 95% yield.

The polymer was crystalline, had an intrinsic viscosity of 0.75, Tm of 303° C. and Tg of 135° C., and had repeating units of the formula:

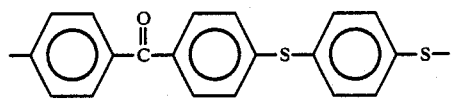

The polymer was not dissolved in a solvent selected from methylene chloride, chloroform, N,N-dimethylformamide, sulfolane, dimethylsulfoxide, hexamethylphosphorictriamide, hexane or toluene at room temperature.

Elementary analysis of the polymer was as follows:

|  | C (%) | H (%) | O (%) | S (%) |
|---|---|---|---|---|
| Found | 71.3 | 3.9 | 4.9 | 19.8 |
| Calculated | 71.22 | 3.77 | 4.99 | 20.01 |

Figure 7:
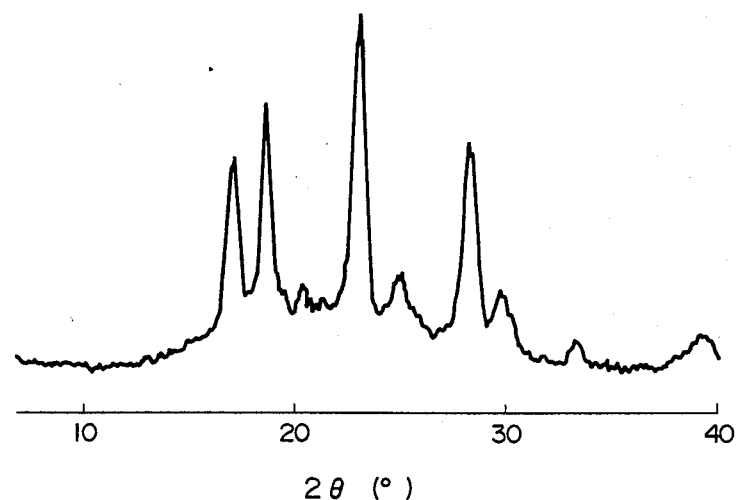
Figure 8:
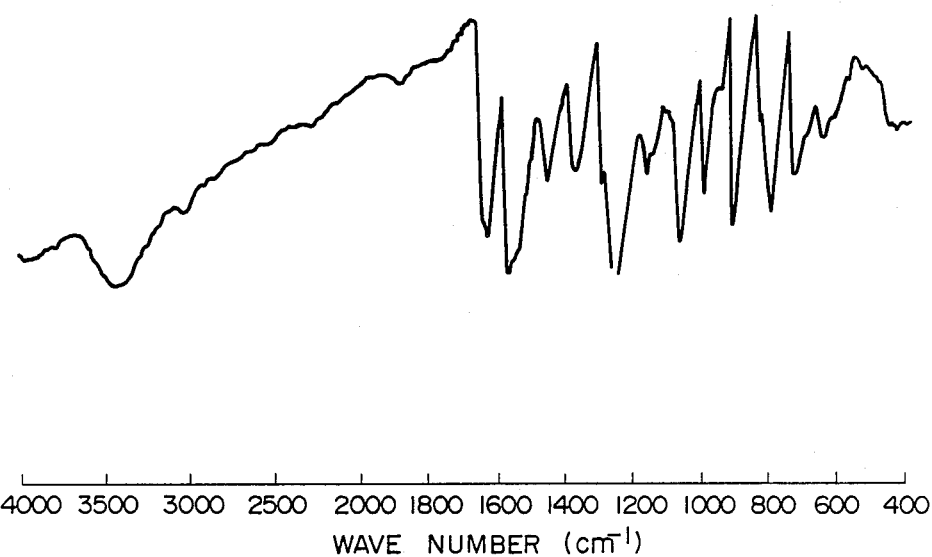
Figure 9:
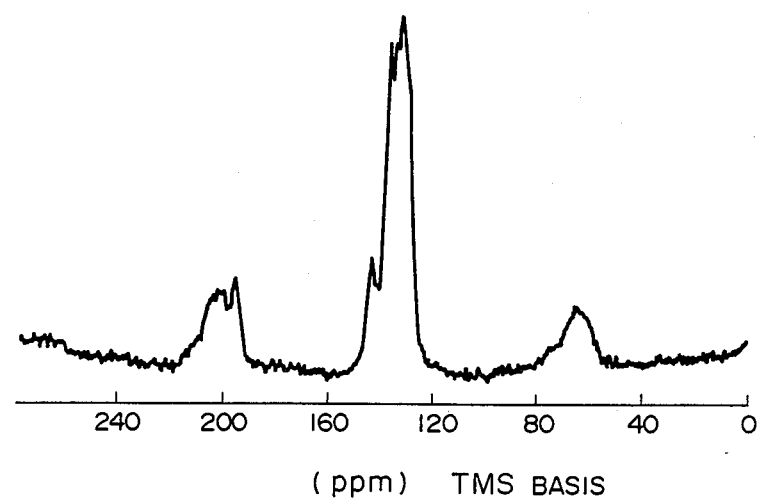
FIG. 9 is a $^{13}$C-NMR chart of the polymer in solid state obtained in Example 10 of this invention.

The X-ray diffraction chart, IR analysis chart and solid $^{13}$C-NMR chart are shown in FIGS. 7, 8 and 9, respectively. For the X-ray diffraction analysis, IR analysis and solid $^{13}$C-NMR analysis, there was used the polymer powder obtained by the polymerization as it was.

When the polymer was pressed at 360° C. for 5 minutes, the resulting film had tensile strength of 850 kg/cm$^2$ and elongation at break of 50% measured according to ASTM D882.

EXAMPLE 11

The process of Example 10 was repeated except for using 17.57 g (0.070 mole) of 4,4'-dichlorobenzophenone, 10.44 g (0.0735 mole) of p-dimercaptobenzene, 9.66 g (0.070 mole) of anhydrous potassium carbonate and diphenylsulfone as a solvent, and carrying out the last stage of the polymerization at 330° C. for 4 hours to give a polymer.

The polymer was crystalline and had an intrinsic viscosity of 0.45.

EXAMPLE 12

The process of Example 1 was repeated except for using 8.28 g (0.038 mole) of 4,4'-difluorobenzophenone, 5.68 g (0.040 mole) of p-dimercaptobenzene, 4.24 g (0.040 mole) of anhydrous sodium carbonate and 40 g of benzophenone, adding the anhydrous sodium carbonate from the beginning, and carrying out the last stage of the reaction at 295° C. for 3 hours to produce a polymer.

The polymer was crystalline and had an intrinsic viscosity of 0.68, Tm of 304° C. and Tg of 135° C.

When the polymer was pressed at 360° C. for 5 minutes, there was obtained a tough film strong in folding.

The polymer had repeating units obtained by alternately bonding the repeating unit of (Ib) and the repeating unit of (IIb) represented by the formula:

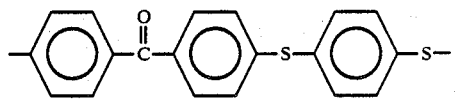

EXAMPLE 13

The process of Example 1 was repeated except for using 8.89 g (0.0408 mole) of 4,4'-difluorobenzophenone, 5.04 g (0.040 mole) of 4-hydroxythiophenol, 2.76 g (0.020 mole) of anhydrous potassium carbonate, 2.12 g (0.020 mole) of anhydrous sodium carbonate, and 40 g of benzophenone, adding the anhydrous potassium carbonate and the anhydrous sodium carbonate from the beginning, and carrying out the last stage of the reaction at 280° C. for 3 hours to yield a polymer.

The polymer was crystalline and had an intrinsic viscosity of 1.02, Tm of 276° C. and Tg of 143° C.

The polymer had repeating units of the formulae (Ib) and (IIa) bonded alternately represented by the formulae:

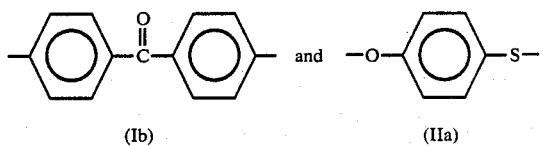

The polymer was not dissolved in a solvent selected from methylene chloride, chloroform, N,N-dimethylformamide, sulfolane, dimethylsulfoxide, hexamethylphosphorictriamide, hexane or toluene at room temperature.

Elementary analysis of the polymer was as follows:

|  | C (%) | H (%) | O (%) | S (%) |
|---|---|---|---|---|
| Found | 75.1 | 4.0 | 10.4 | 10.4 |
| Calculated | 74.99 | 3.97 | 10.51 | 10.53 |

Figure 10:
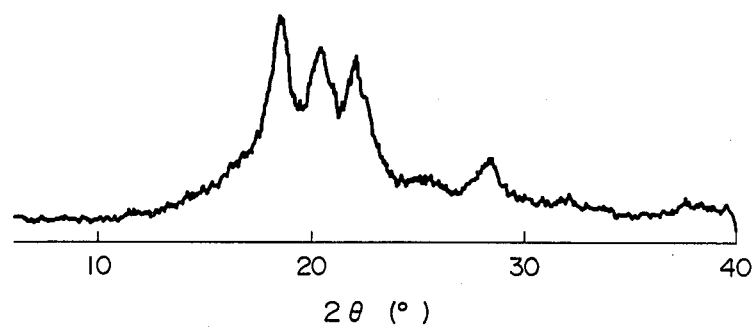

An X-ray diffraction chart of the polymer is shown in FIG. 10. For the X-ray diffraction analysis, there was used the polymer powder obtained by the polymerization as it was.

When the polymer was pressed at 360° C. for 5 minutes, the resulting film was very tough and strong against repeated folding and had a tensile strength of 810 kg/cm$^2$ and an elongation at break of 100% measured according to ASTM D882.

EXAMPLE 14

The air in a four-necked separable flask equipped with a stirrer, a nitrogen introducing pipe and a condenser was replaced by nitrogen, and 17.58 g (0.070 mole) of 4,4'-dichlorobenzophenone, 8.82 g (0.070 mole) of 4-hydroxythiophenol, 9.66 g (0.070 mole) of anhydrous potassium carbonate and 40 g of xanthone were placed in the flask and heated under a nitrogen atmosphere and atmospheric pressure. The temperature was raised to 200° C. for 2 hours, to 300° C. for 1 hour and maintained at that temperature for 2 hours to give a viscous reaction solution. The reaction was carried out under atmospheric pressure from the beginning. Then, 4 g of dichlorodiphenylsulfone was added at that temperature to stabilize the terminals. After cooling, water was added thereto. The obtained solid was pulverized and washed with warm acetone twice, warm water twice and warm acetone once to give a white solid quantitatively.

The polymer was crystalline and had an intrinsic viscosity of 0.95, Tm of 276° C. and Tg of 140° C.

When the polymer was pressed at 400° C. for 5 minutes, the resulting film was tough and strong against folding.

EXAMPLE 15

Using the same apparatus as used in Example 1, 8.79 g (0.035 mole) of 4,4'-dichlorobenzophenone, 8.82 g (0.070 mole) of 4-hydroxythiophenol, 4.83 g (0.035 mole) of anhydrous potassium carbonate and 60 g of diphenylsulfone were heated under a nitrogen atmosphere. The temperature was maintained at 150° C. for 1 hour, at 220° C. for 40 minutes and lowered to room temperature while allowed to stand. Then 8.79 g (0.035 mole) of 4,4'-dichlorobenzophenone, and 4.83 g (0.035 mole) of anhydrous potassium carbonate were added to the reaction system and heated at 150° C. for 1 hour, at 180° C. for 1 hour, at 250° C. for 1 hour and heated to 310° C. and maintained at that temperature for 3 hours. Then the reaction mixture was cooled and a solid product was pulverized and washed with warm acetone twice, warm water twice and warm water once to give a polymer quantitatively.

The polymer was crystalline and had an intrinsic viscosity of 1.0, Tm of 270° C. and Tg of 140° C.

The differences in Tm and Tg of this polymer compared with those of polymer of Example 13 seem to be dependent on the bonding form of the repeating units (Ib) and (IIa) as explained previously. That is, the repeating unit of the formula:

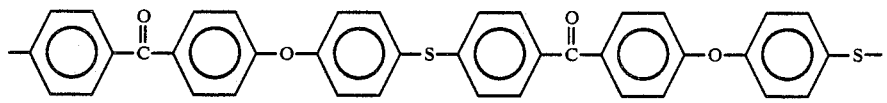

is preferentially formed in Example 13, while the repeating unit of the formula:

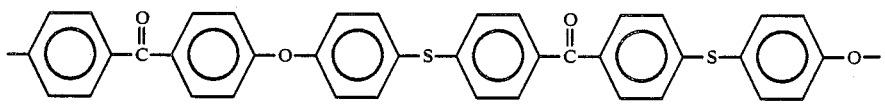

is preferentially formed in Example 15.

When the polymer was pressed at 360° C. for 5 minutes, the resulting polymer was very tough and strong against repeated folding.

Figure 11:
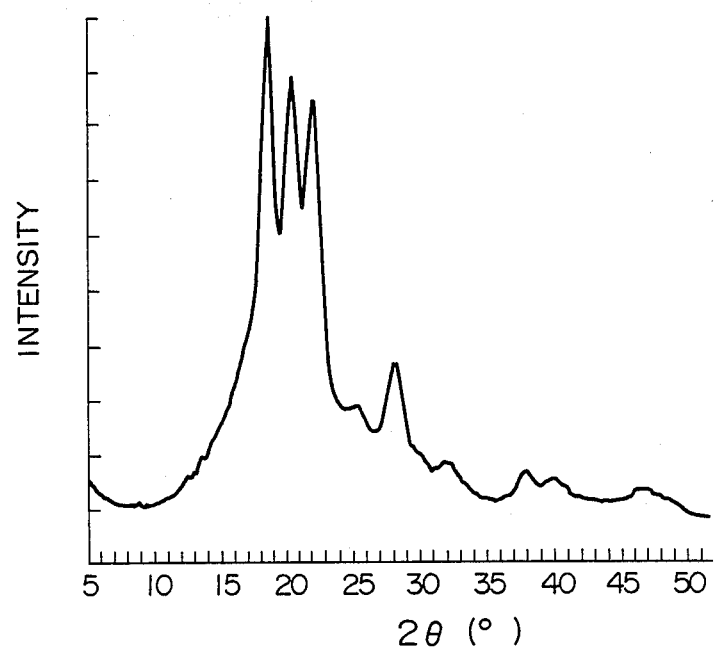

The X-ray diffraction chart of the polymer is shown in FIG. 11. For the X-ray diffraction analysis, there was used the polymer powder obtained by the polymerization as it was.

EXAMPLE 16

The air in a four-necked separable flask equipped with a stirrer, a nitrogen introducing pipe and a condenser was replaced by nitrogen, and 10.34 g (0.032 mole) of 4,4'-difluoroterephthalophenone, 1.75 g (0.008 mole) of 4,4'-difluorobenzophenone, 5.04 g (0.040 mole) of 4-hydroxythiophenol, 5.52 g (0.040 mole) of anhydrous potassium carbonate and 40 g of diphenylsulfone were placed in the flask and heated under a nitrogen atmosphere. The temperature was raised to 320° C. in 1.5 hours and maintained at that temperature for 3 hours. Then, methyl chloride was blown into the reaction system at that temperature for 20 minutes. After cooling, the resulting solid product was pulverized and washed with warm acetone twice, warm water twice and warm acetone once to obtain a copolymer in 98% yield.

The copolymer was crystalline and had an intrinsic viscosity of 0.83, Tm of 323° C. and Tg of 149° C. The copolymer was not dissolved in a solvent of methylene chloride, chloroform, N,N-dimethylformamide, sulfolane, dimethylsulfoxide, hexamethylphosphorictriamide, hexane or toluene at room temperature.

The copolymer had repeating units of aromatic ketone units [I] of the formulae:

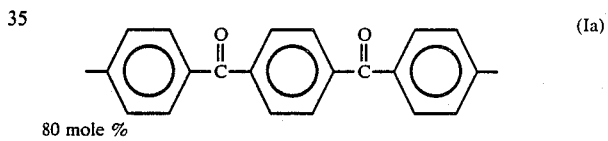

80 mole %

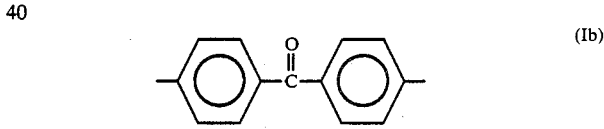

20 mole % and the unit of the formula:

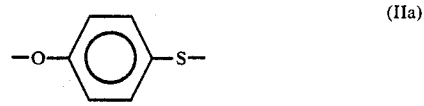

individual units [I] and (IIa) being bonded alternately.

Figure 12:
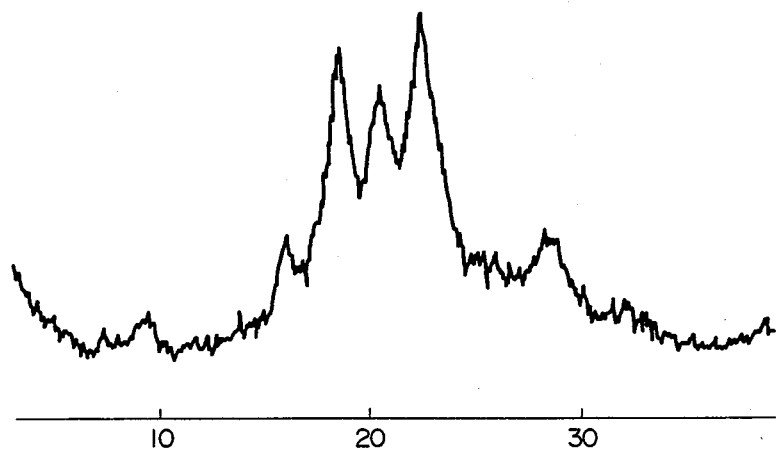
Figure 13:
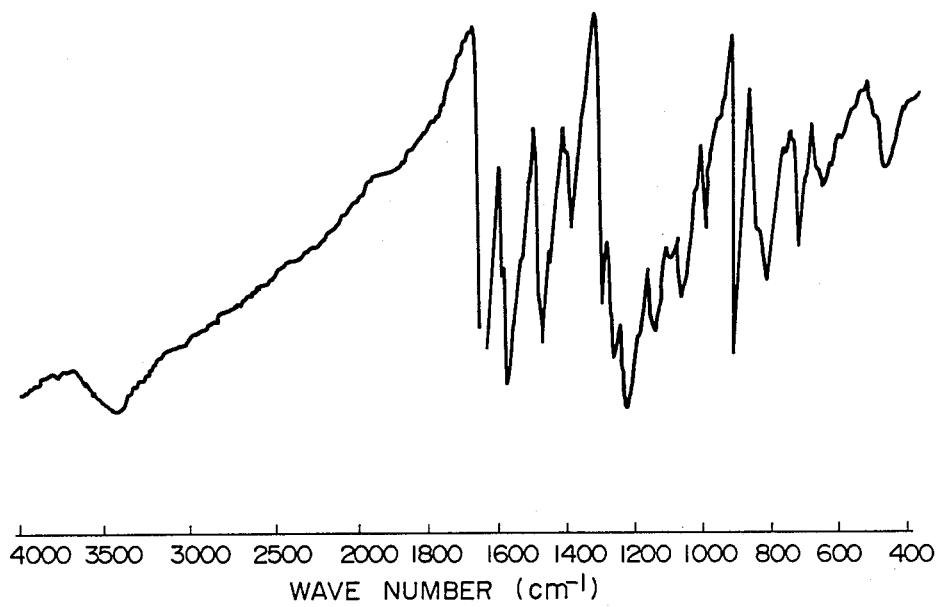

The X-ray diffraction chart and IR analysis chart of the copolymer are shown in FIGS. 12 and 13 respectively. For the X-ray diffraction and IR analysis, there was used the copolymer powder obtained by the polymerization as it was.

Elementary analysis of the copolymer was as follows:

|  | C (%) | H (%) | O (%) | S (%) |
|---|---|---|---|---|
| Found | 76.1 | 3.9 | 11.5 | 8.3 |
| Calculated | 76.22 | 3.95 | 11.56 | 8.27 |

When the copolymer was pressed at 370° C. for 4 mintes, the resulting film was very tough and strong against repeated folding and had a tensile strength of 910 kg/cm$^2$ and elongation at break of 90% measured according to ASTM D882.

The film obtained by pressing the copolymer at 400° C. for 30 minutes had an intrinsic viscosity of 0.84. There was almost no difference between the intrinsic viscosities before and after the pressing of the copolymer.

EXAMPLE 17

The process of Example 1 was repeated except for using 7.24 g (0.0204 mole) of 4,4'-dichloroterephthalophenone, 6.57 g (0.0204 mole) of 4,4'-dichlorobenzophenone, 5.04 g (0.040 mole) of 4-hydroxythiophenol, 5.52 g (0.040 mole) of anhydrous potassium carbonate and 40 g of benzophenone and carrying out the last stage of the reaction at 300° C. for 5 hours to give a copolymer.

The copolymer had an intrinsic viscosity of 0.76, Tm of 311° C. and Tg of 147° C. and was crystalline.

When the copolymer was pressed at 380° C. for 5 minutes, the resulting film was very tough and strong for repeated folding.

The copolymer had a structure having repeating units [I] containing

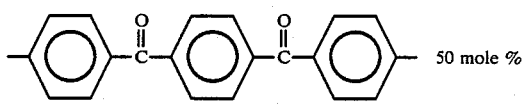 (Ia) 50 mole %

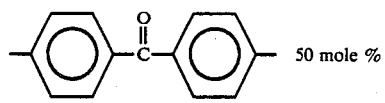 (Ib) 50 mole % and repeating units:

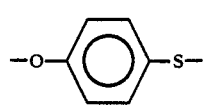 (IIa)

individual units [I] and (IIa) being bonded alternately.

EXAMPLE 18

The process of Example 16 was repeated except for using 2.58 g (0.008 mole) of 4,4'-difluoroterephthalophenone, 6.98 g (0.032 mole) of 4,4'-difluorobenzophenone, 5.04 g (0.040 mole) of 4-hydroxythiophenol, 3.86 g (0.028 mole) of anhydrous potassium carbonate and 40 g of diphenylsulfone, and carrying out the last stage of the reaction at 300° C. to give a copolymer.

The copolymer was crystalline and had an intrinsic viscosity of 0.95, Tm of 291° C., Tg of 144° C., and a structure having repeating units [I] containing

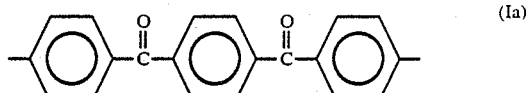 (Ia) 20 mole %

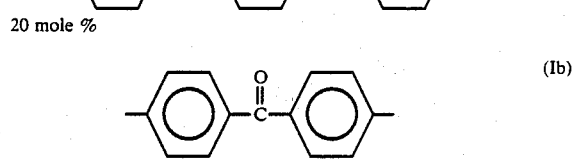 (Ib) 80 mole % and repeating units:

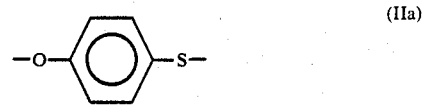 (IIa)

individual units [I] and (IIa) being bonded alternately.

EXAMPLE 19

Using the same apparatus as used in Example 1, 4.36 g (0.020 mole) of 4,4'-difluorobenzophenone, 5.04 g (0.040 mole) of 4-hydroxythiophenol, 4.24 g (0.040 mole) of anhydrous sodium carbonate, and 40 g of xanthone were heated under a nitrogen atmosphere. After the temperature was maintained at 170° C. for 1 hour, 6.47 g (0.0201 mole) of 4,4'-difluoroterephthalophenone was added to the reaction system and heated to 300° C. in 30 minutes. The reaction was carried out under an atmospheric pressure from the beginning. After maintaining the temperature at 300° C. for 3 hours, 40 g of 4,4'-difluorobenzophenone was added to the reaction system as a terminator and maintained for 30 minutes. After cooling, the resulting solid was pulverized and washed with warm acetone twice, warm water twice and warm acetone twice to give a crystalline copolymer having an intrinsic viscosity of 0.93.

The copolymer had a structure having repeating units [I] containing:

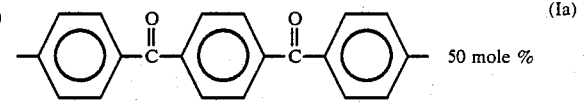 (Ia) 50 mole %

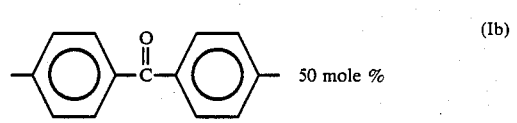 (Ib) 50 mole % and repeating units:

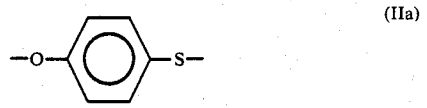 (IIa)

individual units [I] and (IIa) being bonded alternately, that is, the repeating unit of the formula:

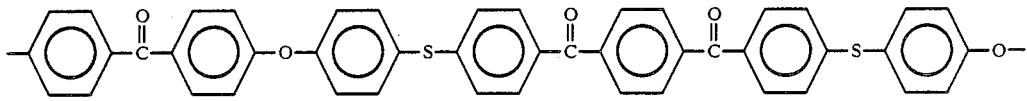

seems to be formed preferentially.

EXAMPLE 20

The air in a four-necked separable flask equipped with a stirrer, a nitrogen introducing pipe and a condenser was replaced by nitrogen, and 6.44 g (0.020 mole) of 4,4'-difluoroterephthalophenone, 4.36 g (0.020 mole) of 4,4'-difluorobenzophenone, 5.96 g (0.042 mole) of p-dimercaptobenzene and 30 g of xanthone were placed in the flask and heated under a nitrogen atmosphere. After adding 3.84 g (0.028 mole) of anhydrous potassium carbonate at 120° C. to the reaction system, the temperature was raised to 300° C. in 1.5 hours and maintained at that temperature for 3 hours. Then, 4 g of dichlorodiphenylsulfone was added to the reaction system and the contents were maintained at that temperature for 30 minutes. After cooling, the resulting solid was pulverized and washed with warm acetone twice, warm water twice and warm acetone once to give a copolymer in 96% yield.

The copolymer was crystalline and had an intrinsic viscosity of 0.83, Tm of 347° C., Tg of 139° C. and a structure of repeating units [I] containing:

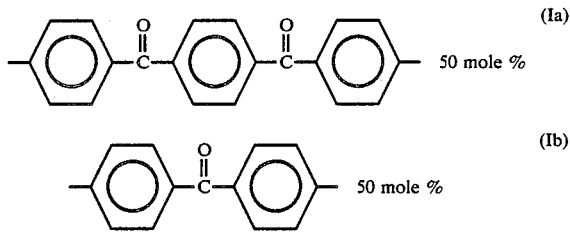

and repeating units:

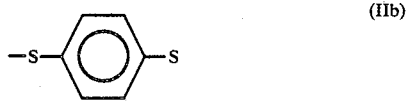

individual units [I] and (IIb) being bonded alternately.

The copolymer was not dissolved in a solvent of methylene chloride, chloroform, N,N-dimethylformamide, sulfolane, dimethylsulfoxide, hexamethylphosphorictriamide, hexane or toluene.

Elementary analysis of the copolymer was as follows:

|  | C (%) | H (%) | O (%) | S (%) |
|---|---|---|---|---|
| Found | 72.6 | 3.9 | 6.3 | 17.1 |
| Calculated | 72.55 | 3.79 | 6.44 | 17.21 |

Figure 14:
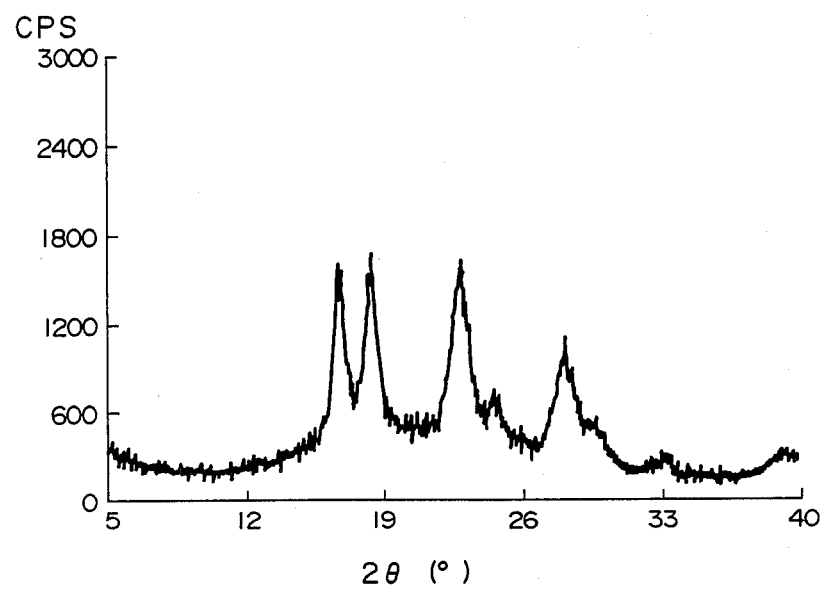
Figure 15:
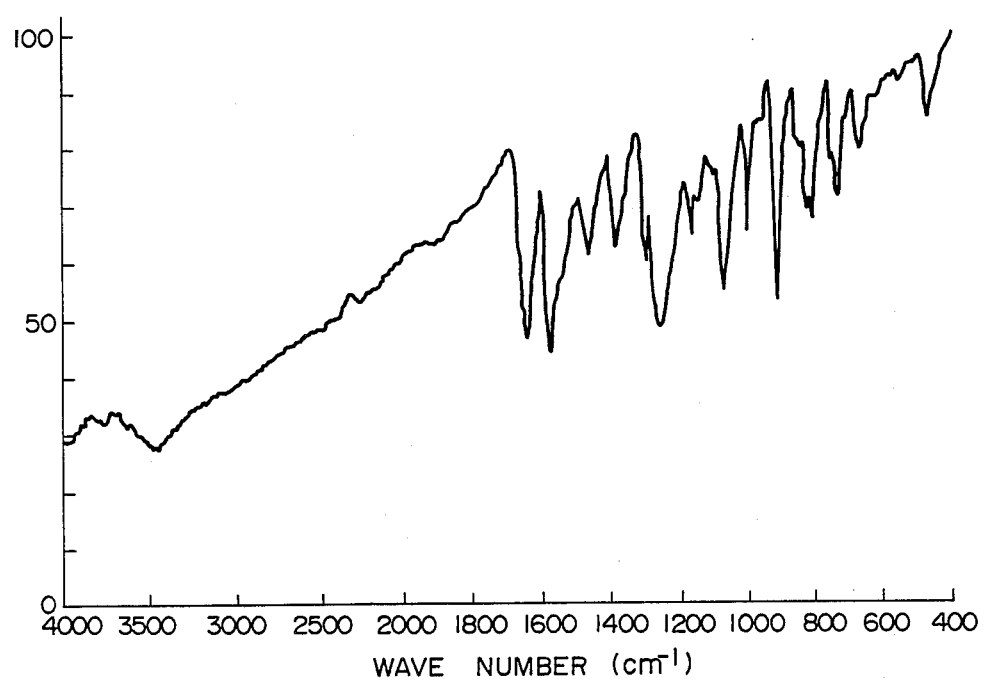

The X-ray diffraction chart and IR analysis chart are shown in FIGS. 14 and 15, respectively. For the X-ray diffraction and the IR analysis, there was used the copolymer powder obtained by the polymerization as it was.

When the copolymer was pressed at 360° C. for 5 minutes, the resulting film had tensile strength of 860 kg/cm$^2$ and elongation at break of 40% measured according to ASTM D882.

EXAMPLE 21

The process of Example 20 was repeated except for using 9.02 g (0.028 mole) of 4,4'-difluoroterephthalophenone, 2.62 g (0.012 mole) of 4,4'-difluorobenzophenone, 5.96 g (0.042 mole) of p-dimercaptobenzene, 30 g of thioxanthone, 2.12 g (0.020 mole) of anhydrous sodium carbonate and 2.76 g (0.020 mole) of anhydrous potassium carbonate, and carrying out the last stage of the reaction at 290° C. for 4 hours to give a copolymer.

The copolymer was crystalline and had an intrinsic viscosity of 0.73, Tm of 358° C., Tg of 140° C., and a structure of repeating units of aromatic ketone units [I] containing 70 mole % of (Ia) and 30 mole % of (Ib) and units (IIb), individual units [I] and (IIb) being bonded alternately.

EXAMPLE 22

The process of Example 20 was repeated except for using 1.42 g (0.004 mole) of 4,4'-dichloroterephthalophenone, 9.04 g (0.036 mole) of 4,4'-dichlorobenzophenone, 5.82 g (0.041 mole) of p-dimercaptobenzene, 30 g of xanthone and 5.52 g (0.040 mole) of anhydrous potassium carbonate, and carrying out the last stage of the reaction at 310° C. for 5 hours to give a copolymer.

The copolymer was crystalline and had an intrinsic viscosity of 0.67, Tm of 310° C., Tg of 136° C., and a structure of repeating units of aromatic ketone units [I] containing 10 mole % of (Ia) and 90 mole % of (Ib) and units (IIb), individual units [I] and (IIb) being bonded alternately.

EXAMPLE 23

Using the same apparatus as used in Example 1, 7.10 g (0.020 mole) of 4,4'-dichloroterephthalophenone, 2.90 g (0.0204 mole) of p-dimercaptobenzene and 30 g of thioxanthone were heated under a nitrogen atmosphere. Then, 2.12 g (0.020 mole) of anhydrous sodium carbonate was added at 120° C. and the temperature was raised to 300° C. in 1 hour and maintained at that temperature for 3 hours. After cooling to room temperature, 4.36 g (0.020 mole) of 4,4'-difluorobenzophenone and 2.90 g (0.0204 mole) of p-dimercaptobenzene were added to the reaction system and heated. At 120° C., 2.12 g (0.020 mole) of anhydrous sodium carbonate was added and the temperature was raised to 300° C. and maintained at that temperature for 3 hours. Then, methyl chloride was blown into the reaction system, which was cooled while allowed to stand to give a copolymer in the same manner as described in Example 20.

The copolymer was crystalline and had an intrinsic viscosity of 0.71. This copolymer seems to have a structure wherein the repeating units (Ia) and (Ib) are distributed block-wise.

EXAMPLE 24

The process of Example 1 was repeated except for using 6.44 g (0.020 mole) of 4,4'-difluoroterephthalophenone, 4.36 g (0.020 mole) of 4,4'-difluorobenzophenone, 5.68 g (0.040 mole) of p-dimercaptobenzene, 4.41 g (0.032 mole) of anhydrous potassium carbonate and 40 g of benzophenone and adding the potassium carbonate at 90° C. to give a copolymer.

The copolymer was crystalline and had an intrinsic viscosity of 0.71, Tm of 346° C. and Tg of 139° C.

When the copolymer was pressed at 400° C. for 5 minutes, the resulting film was very tough and strong against repeated folding.

The copolymer had a structure of repeating units [I] containing:

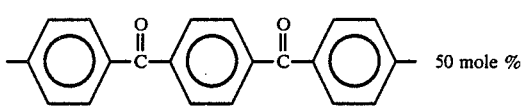 50 mole % (Ia)

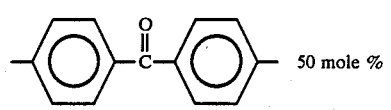 50 mole % (Ib)

and repeating units:

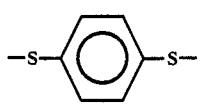 (IIb)

individual units [I] and (IIb) being bonded alternately.

EXAMPLE 25

The air in a four-necked separable flask equipped with a stirrer, a nitrogen introducing pipe, and a condenser was replaced by nitrogen, and 12.88 g (0.040 mole) of 4,4'-difluoroterephthalophenone, 2.90 g (0.0204 mole) of p-dimercaptobenzene, 2.57 g (0.0204 mole) of 4-hydroxythiophenol and 40 g of xanthone were placed in the flask and heated under a nitrogen atmosphere. Then, 3.86 g (0.028 mole) of anhydrous potassium carbonate was added at 120° C. and the temperature was raised to 300° C. in 1.5 hours and maintained at that temperature for 3 hours. Then, 4.0 g of dichlorodiphenylsulfone was added to the reaction system and the temperature was maintained at 300° C. for 30 minutes. After cooling, the resulting solid was pulverized and washed with warm acetone twice, warm water twice and warm acetone once to give a copolymer in 97% yield.

The copolymer was crystalline and had an intrinsic viscosity of 1.37, Tm of 339° C. and Tg of 147° C.

The copolymer was not dissolved in a solvent of methylene chloride, chloroform, N,N-dimethylformamide, sulfolane, dimethylsulfoxide, hexamethylphosphorictriamide, hexane or toluene at room temperature.

The copolymer had a structure of repeating units:

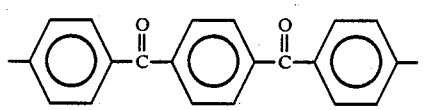 (Ia)

and repeating aromatic ether-thioether units [II] containing:

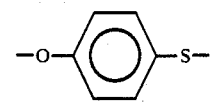 (IIa)

50 mole %

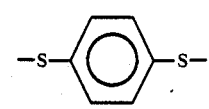 (IIb)

50 mole % individual units (Ia) and [II] being bonded alternately.

Figure 16:
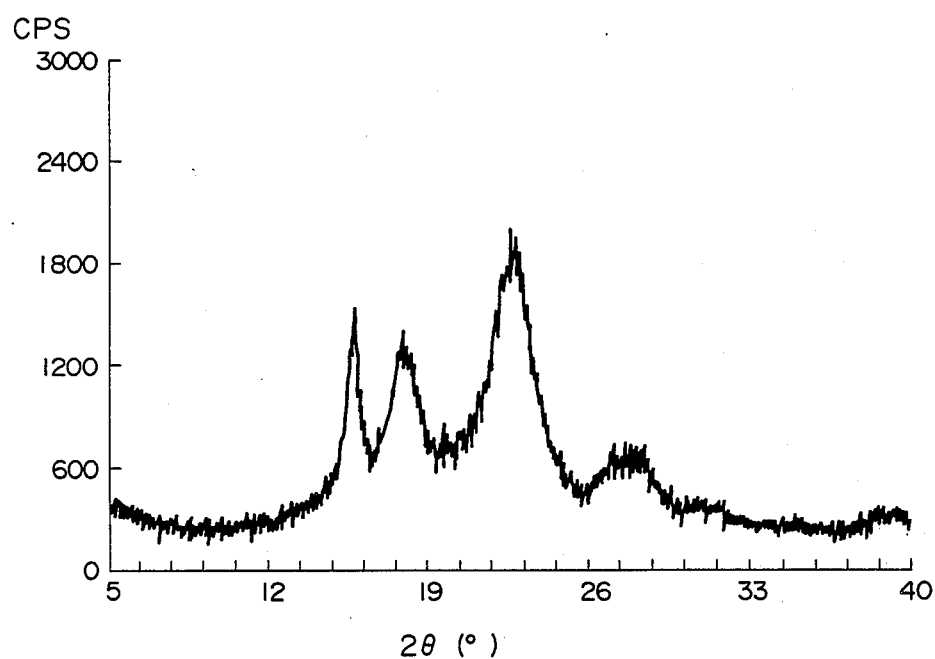
Figure 17:
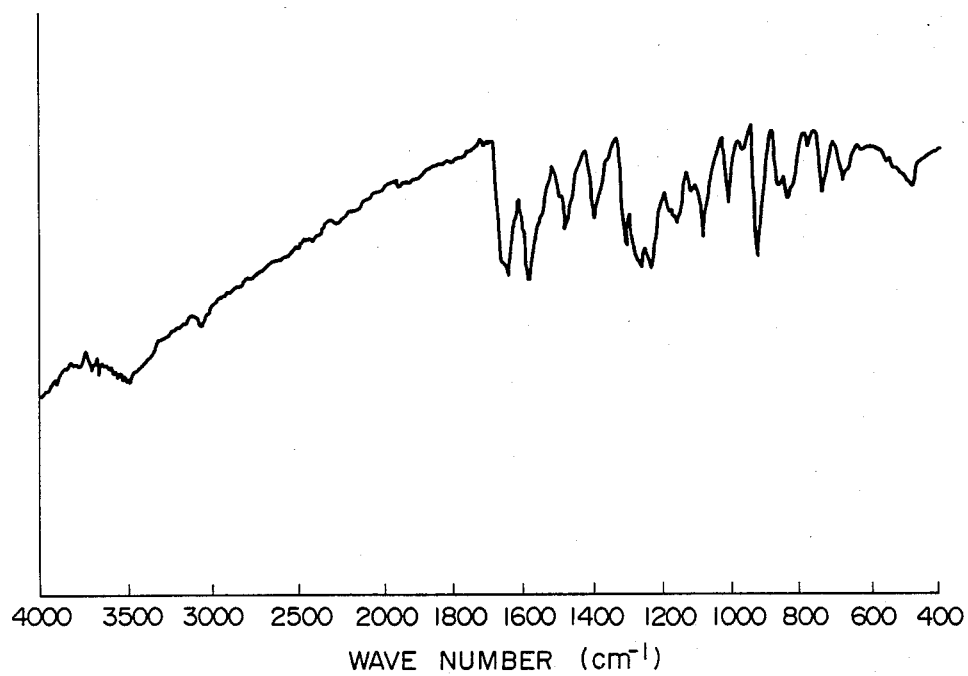

The X-ray diffraction chart and IR analysis chart of the copolymer are shown in FIGS. 16 and 17. For the X-ray diffraction and IR analysis, there was used the copolymer powder obtained by the polymerization as it was.

Elementary analysis of the copolymer was as follows:

|            | C (%) | H (%) | O (%) | S (%) |
|------------|-------|-------|-------|-------|
| Found      | 74.7  | 3.9   | 9.7   | 11.6  |
| Calculated | 74.98 | 3.87  | 9.60  | 11.55 |

When the copolymer was pressed at 360° C. for 4 minutes, the resulting film was very tough and strong against repeated folding and had tensile strength of 900 kg/cm$^2$ and elongation at break of 80% measured according to ASTM D882.

EXAMPLE 26

The process of Example 25 was repeated except for using 12.88 g (0.040 mole) of 4,4'-difluoroterephthalophenone, 1.82 g (0.0128 mole) of p-dimercaptobenzene, 3.53 g (0.028 mole) of 4-hydroxythiophenol and 40 g of diphenylsulfone, adding 4.24 g (0.040 mole) of anhydrous sodium carbonate from the beginning, and carrying out the last stage of the reaction at 310° C. to give a copolymer.

The copolymer was crystalline and had an intrinsic viscosity of 0.67, Tm of 339° C. and Tg of 148° C.

The copolymer had a structure of repeating units:

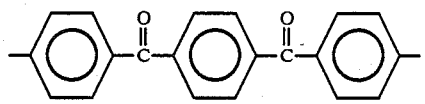 (Ia)

and aromatic ether-thioether units [II] containing:

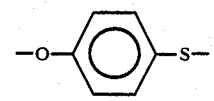 (IIa)

70 mole %

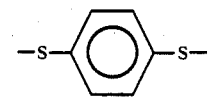 (IIb)

30 mole % individual units (Ia) and [II] being bonded alternately.

EXAMPLE 27

The process of Example 25 was repeated except for using 14.20 g (0.040 mole) of 4,4'-dichloroterephthalophenone, 4.03 g (0.0284 mole) of p-dimercaptobenzene, 1.51 g (0.012 mole) of 4-hydroxythiophenol, 2.76 g (0.020 mole) of anhydrous potassium carbonate, 2.12 g (0.020 mole) of anhydrous sodium carbonate and 40 g of thioxanthone, and carrying out the last stage of the reaction at 320° C. for 5 hours to give a copolymer.

The copolymer was crystalline and had an intrinsic viscosity of 0.75, Tm of 348° C. and Tg of 145° C.

The copolymer had a structure of repeating units:

(Ia)

and aromatic ether-thioether units [II] containing

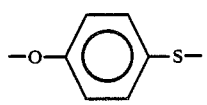
(IIa)

30 mole %

(IIb)

70 mole % individual units (Ia) and [II] being bonded alternately.

EXAMPLE 28

The process of Example 1 was repeated except for using 12.88 g (0.040 mole) of 4,4'-difluoroterephthalophenone, 2.52 g (0.020 mole) of 4-hydroxythiophenol, 2.84 g (0.020 mole) of p-dimercaptobenzene, 4.42 g (0.032 mole) of anhydrous potassium carbonate and 40 g of benzophenone, adding the anhydrous potassium carbonate from the beginning, and carrying out the last stage of the reaction at 305° C. for 4 hours to give a copolymer.

The copolymer was crystalline and had an intrinsic viscosity of 0.78, Tm of 338° C. and Tg of 147° C.

When the copolymer was pressed at 360° C. for 5 minutes, the resulting film was very tough against repeated folding.

The copolymer had a structure of repeating units:

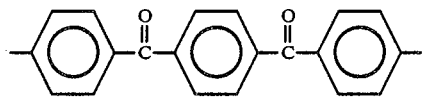
(Ia)

and repeating units [II] containing:

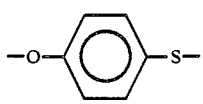
(IIa)

50 mole %

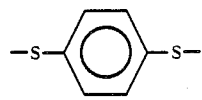
(IIb)

50 mole % individual units (Ia) and [II] being bonded alternately.

EXAMPLE 29

The air in a four-necked separable flask equipped with a stirrer, a nitrogen introducing pipe and a condenser was replaced by nitrogen, and 8.72 g (0.040 mole) of 4,4'-difluorobenzophenone, 2.90 g (0.0204 mole) of p-dimercaptobenzene, 2.52 g (0.020 mole) of 4-hydroxythiophenol, and 30 g of xanthone were placed in the flask and heated under a nitrogen atmosphere. Then, 3.86 g (0.028 mole) of anhydrous potassium carbonate was added at 120° C. and the temperature was raised to 300° C. in 1.5 hours and maintained at that temperature for 3 hours. After adding 4.0 g of dichlorodiphenylsulfone to the reaction system, the temperature was maintained at 300° C. for 30 minutes. After cooling, the resulting solid was pulverized, and washed with warm acetone twice, warm water twice and warm acetone once to give a copolymer in 98% yield.

The copolymer was crystalline and had an intrinsic viscosity of 0.72, Tm of 282° C. and Tg of 136° C.

The copolymer was not dissolved in a solvent of methylene chloride, chloroform, N,N-dimethylformamide, sulfolane, dimethylsulfoxide, hexamethylphosphorictriamide, hexane or toluene at room temperature.

The copolymer had a structure of repeating units:

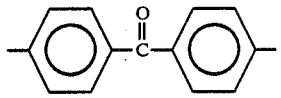
(Ib)

and aromatic ether-thioether units [II] containing:

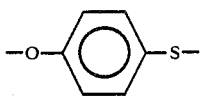
(IIa)

50 mole %

(IIb)

50 mole % individual units (Ib) and [II] being bonded alternately.

Figure 18:
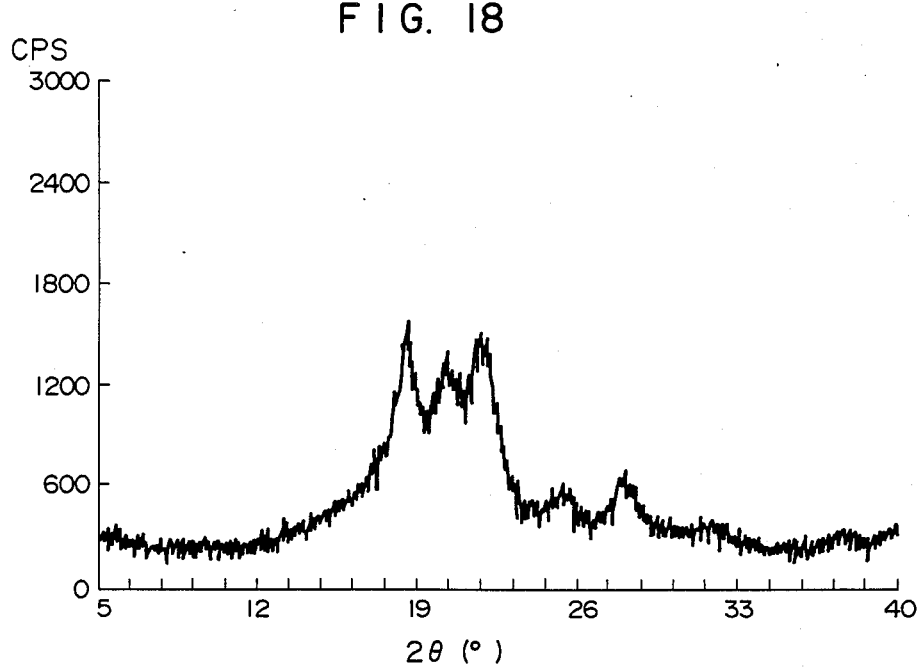
Figure 19:
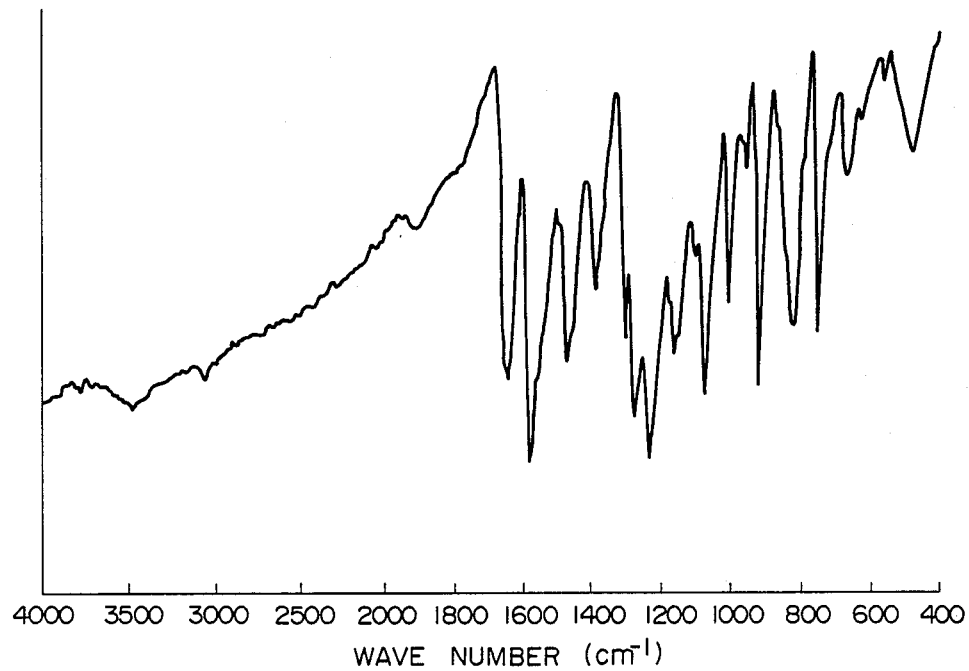

The X-ray diffraction chart and IR analysis chart are shown in FIGS. 18 and 19. For the X-ray diffraction and IR analysis, there was used the polymer powder obtained by the polymerization as it was.

Elementary analysis of the copolymer was as follows:

|  | C (%) | H (%) | O (%) | S (%) |
| --- | --- | --- | --- | --- |
| Found | 73.0 | 3.8 | 7.6 | 15.5 |
| Calculated | 73.05 | 3.87 | 7.68 | 15.40 |

When the copolymer was pressed at 340° C. for 4 minutes, the resulting film was very tough and strong against repeated folding and had a tensile strength of 770 kg/cm² and an elongation at break of 120% measured according to ASTM D882.

EXAMPLE 30

The process of Example 29 was repeated except for using 10.04 g (0.040 mole) of 4,4'-dichlorobenzophenone, 4.03 g (0.0284 mole) of p-dimercaptobenzene, 1.51 g (0.012 mole) of 4-hydroxythiophenol, 2.76 g (0.020 mole) of anhydrous potassium carbonate, 2.12 g (0.020 mole) of anhydrous sodium carbonate and 30 g of thioxanthone, and carrying out the last stage of the reaction at 310° C. for 5 hours to give a copolymer.

The copolymer was crystalline and had an intrinsic viscosity of 0.58, Tm of 287° C. and Tg of 135° C.

The copolymer had a structure of repeating units:

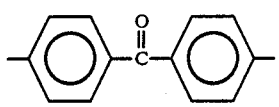
(Ib)

and aromatic ether-thioether units [II] containing:

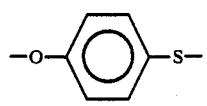
(IIa)

30 mole %

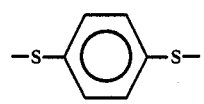
(IIb)

70 mole % individual units (Ib) and [II] being bonded alternately.

EXAMPLE 31

The process of Example 1 was repeated except for using 10.04 g (0.040 mole) of 4,4'-dichlorobenzophenone, 2.52 g (0.020 mole) of 4-hydroxythiophenol, 2.84 g (0.020 mole) of p-dimercaptobenzene, 5.52 g (0.040 mole) of anhydrous potassium carbonate and 40 g of benzophenone, adding the anhydrous potassium carbonate at 90° C., and carrying out the last stage of the reaction at 290° C. for 4 hours to give a copolymer.

The copolymer was crystalline and had an intrinsic viscosity of 0.58, Tm of 290° C. and Tg of 138° C.

When the copolymer was pressed at 360° C. for 5 minutes, the resulting film was very tough and strong against folding.

The copolymer had a structure of repeating units:

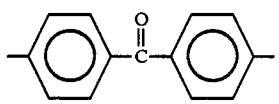
(Ib)

and repeating units [II] containing:

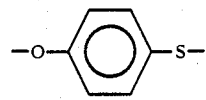
(IIa)

50 mole %

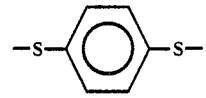
(IIb)

50 mole % individual units (Ib) and [II] being bonded alternately.

EXAMPLE 32

The process of Example 1 was repeated except for using 10.56 g (0.0328 mole) of 4,4'-difluoroterephthalophenone, 3.92 g (0.0080 mole) of 4,4'-difluorobenzophenone, 1.26 g (0.010 mole) of 4-hydroxythiophenol, 4.26 g (0.030 mole) of p-dimercaptobenzene, 5.52 g (0.040 mole) of anhydrous potassium carbonate and 40 g of benzophenone to give a crystalline copolymer having an intrinsic viscosity of 0.67.

EXAMPLE 33

Using the polymer obtained in Example 1, the copolymer obtained in Example 20, PEEK (aromatic polyetheretherketone, mfd. by Imperial Chemical Industries, Ltd., Victrex PEEK, 45P a grade name) (comparison) and polyphenylenesulfide (Ryton PPS, P-4, a trade name mdf. by Phillips Petroleum Co.) (comparison), the oxygen index was measured.

The oxygen index was measured by forming a sample of No. B-1 film by press molding according to JIS K7201 and using a D type candle flammability tester (mfd. by Toyo Seiki Co., Ltd.).

The results are shown in Table 1.

TABLE 1

| | Oxygen index (%) | Film thickness (μm) |
| --- | --- | --- |
| Polymer (Ex. 1) | 29.2 | 130 |
| Copolymer (Ex. 20) | 30.5 | 150 |
| PEEK | 23.5 | 120 |
| Polyphenylenesulfide | 28.6 | 160 |

As is clear from Table 1, the polymer and copolymer of the present invention are by far excellent in fire retardancy compared with PEEK, and equal to or slightly better in fire retardancy than polyphenylenesulfide which is known to be excellent in fire retardancy.

EXAMPLE 34

Using the polymer obtained in Example 5 and PEEK used in Example 33, the melt index (MI) was measured. The melt index was measured according to ASTM D1238 using a Melt Indexer (mfd. by Toyo Seiki Co., Ltd.) and 5 g of a sample at 400° C.

The results are shown in Table 2.

TABLE 2

| | MI (g/10 min) | Intrinsic viscosity |
| --- | --- | --- |
| Polymer (Ex. 5) | 21 | 0.80 |
| PEEK | 3.2 | 0.79 |

As is clear from Table 2, the polymer of this invention has the MI value about 7 times as large as that of a conventional aromatic polyetherketone (PEEK) when the intrinsic viscosity is the same; this means that the polymer of this invention has good flow properties.

EXAMPLE 35

Using the polymers as listed in Table 3 belonging to this invention and polyphenylenesulfide commercially available (Ryton PPS, P-4 used in Example 33), the weight loss with heating was measured.

The measurement was conducted by raising the temperature at a rate of 10° C./min in air and measuring the temperature at which the weight loss became 5% by weight.

The results are shown in Table 3.

TABLE 3

| Polymer | Temperature of 5% weight loss (°C.) |
| --- | --- |
| Polymer (Ex. 1) | 550 |
| Polymer (Ex. 8) | 540 |
| Polymer (Ex. 10) | 530 |
| Polymer (Ex. 13) | 535 |
| Polyphenylenesulfide | 480 |

As is clear from Table 3, the polymers of this invention have excellent thermal stability by 50° to 70° C. compared with the conventional polyphenylenesulfide.

COMPARATIVE EXAMPLE 1

The polymerization and separation of the resulting polymer were conducted in the same manner as described in Example 1 except for using dimethylsulfoxide in place of benzophenone as a polymerization solvent. The polymer obtained was black, not dissolved in concentrated sulfuric acid and gelated.

COMPARATIVE EXAMPLE 2

The polymerization and separation of the resulting polymer were conducted in the same manner as described in Example 1 except for using dimethylsulfoxide in place of benzophenone as a polymerization solvent and carrying out the polymerization at 150° C. for 4 hours. The polymer was obtained in 70% yield and had an intrinsic viscosity of 0.1.

COMPARATIVE EXAMPLE 3

To a 150 ml dichloroethane solution containing 8.97 g of terephthaloyl dichloride and 13 g of 1,4-bis(phenylmercaptobenzene), 15.25 g of aluminum chloride was added. The reaction mixture was maintained at a temperature of 5° C. or below with water cooling. After adding aluminum chloride, the reaction was carried out with ice cooling for 4 hours with stirring, followed by the reaction at room temperature for 17 hours. The reaction product was poured into 500 ml of methanol to give a white powder polymer, which was washed with methanol, 2% HCl and water, and dried under vacuum. The resulting polymer had an intrinsic viscosity of 0.11 and a crystalline melting point of 310° C.

EXAMPLE 36

Using the same apparatus as used in Example 1, 6.44 g (0.020 mole) of 4,4'-difluoroterephthalophenone, 5.04 g (0.040 mole) of 4-hydroxythiophenol, 2.12 g (0.020 mole) of anhydrous sodium carbonate, 40 g of benzophenone and 10 ml of toluene were heated under a nitrogen atmosphere. The temperature was maintained at the reflux temperature of toluene for 1 hour and the water produced was removed with the toluene azeotropically. The temperature was maintained at 140° C. for 3 hours. After cooling, 6.44 g (0.020 mole) of 4,4'-difluoroterephthalophenone, 2.76 g (0.020 mole) of anhydrous potassium carbonate and 10 ml of toluene were added to the reaction mixture and maintained at the reflux temperature of toluene for 1 hour to remove the water produced and toluene azeotropically. The temperature was maintained at 150° C. for 1 hour, at 180° C. for 1 hour and at 300° C. for 2 hours. After cooling, a solid was yielded in 95% by the same treatment as in Example 1.

The resulting polymer had an intrinsic viscosity of 0.83, Tm of 355° C. and was crystalline.

EXAMPLE 37

Using the same apparatus as used in Example 1, 7.63 g (0.035 mole) of 4,4'-difluorobenzophenone, 8.82 g (0.070 mole) of 4-hydroxythiophenol, 3.71 g (0.035 mole) of anhydrous sodium carbonate and 60 g of benzophenone were heated under a nitrogen atmosphere. The temperature was maintained at 150° C. for 2 hours, and lowered to room temperature while allowed to stand.

Then 7.63 g (0.035 mole) of 4,4'-difluorobenzophenone, and 4.83 g (0.035 mole) of anhydrous potassium carbonate were added to the reaction system and heated at 150° C. for 1 hour, at 180° C. for 1 hour, at 250° C. for 1 hour and heated to 290° C. and maintained at that temperature for 3 hours. Then the reaction mixture was cooled and a solid product was pulverized and washed with warm acetone twice, warm water twice and warm water once to give a polymer quantitatively.

The polymer was crystalline and had an intrinsic viscosity of 0.96, Tm of 299° C. and Tg of 143° C.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cyrstalline aromatic polyketone having a linear polymer structure substantially comprising repeating units [I] of the formulae:

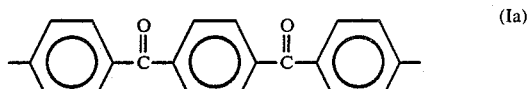

(Ia)

and/or

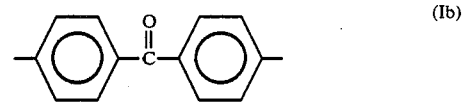

(Ib)

and repeating units [II] of the formulae:

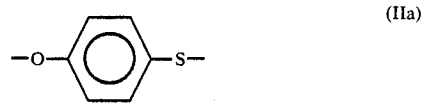

(IIa)

and/or

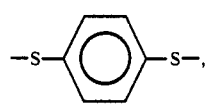 (IIb)

said repeating units [I] and [II] being bonded alternately, and said polymer having an intrinsic viscosity of 0.4 or more.

2. A crystalline aromatic polyketone according to claim 1, wherein the intrinsic viscosity is 0.4 to 1.8.

3. A crystalline aromatic polyketone according to claim 2, wherein the repeating unit [I] is

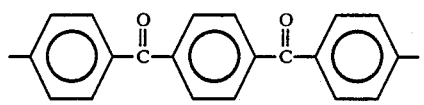 (Ia)

and the repeating unit [II] is

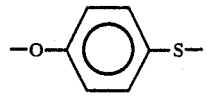 (IIa)

4. A crystalline aromatic polyketone according to claim 2, wherein the repeating unit [I] is

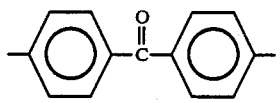 (Ib)

and the repeating unit [II] is

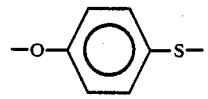 (IIa)

5. A crystalline aromatic polyketone according to claim 2, wherein the repeating unit [I] is

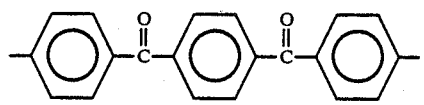 (Ia)

and the repeating unit [II] is

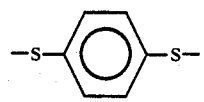 (IIb)

6. A crystalline aromatic polyketone according to claim 5, wherein the polymer has a melting point of 330° C. or higher.

7. A crystalline aromatic polyketone according to claim 2, wherein the repeating unit [I] is

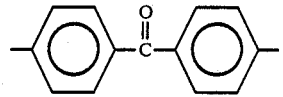 (Ib)

and the repeating unit [II] is

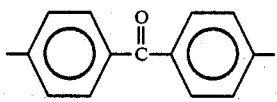 (IIb)

8. A crystalline aromatic polyketone according to claim 7, wherein the polymer has a melting point of 280° C. or higher.

9. A crystalline aromatic polyketone according to claim 2, wherein the repeating unit [I] is 1 to 99 mole % of

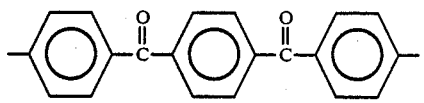 (Ia)

and 99 to 1 mole % of

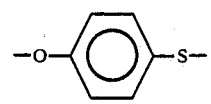 (Ib)

and the repeating unit [II] is

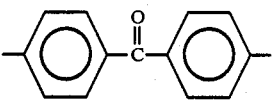 (IIa)

10. A crystalline aromatic polyketone according to claim 2, wherein the repeating unit [I] is 1 to 99 mole % of

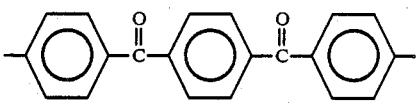 (Ia)

and 99 to 1 mole % of

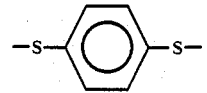 (Ib)

and the repeating unit [II] is

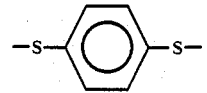 (IIb)

11. A crystalline aromatic polyketone according to claim 2, wherein the repeating unit [I] is ―◯―CO―◯―CO―◯― (Ia)

and the repeating unit [II] is 1 to 99 mole % of

―O―◯―S― (IIa)

and 99 to 1 mole % of

―S―◯―S― (IIb)

12. A crystalline aromatic polyketone according to claim 2, wherein the repeating unit [I] is ―◯―CO―◯― (Ib)

and the repeating unit [II] is 1 to 99 mole % of

―O―◯―S― (IIa)

and 99 to 1 mole % of

―S―◯―S― (IIb)

13. A crystalline aromatic polyketone according to claim 2, wherein the repeating unit [I] is 1 to 99 mole % of ―◯―CO―◯―CO―◯― (Ia)

and 99 to 1 mole % of

―◯―CO―◯― (Ib)

and the repeating unit [II] is 1 to 99 mole % of

―O―◯―S― (IIa)

and 99 to 1 mole % of

―S―◯―S― (IIb)

14. A process for producing a crystalline aromatic polyketone having a linear polymer structure substantially comprising repeating units of the formulae:

―◯―CO―◯―CO―◯― (Ia)

and/or

―◯―CO―◯― (Ib)

and repeating units [II] of the formulae:

―O―◯―S― (IIa)

and/or

―S―◯―S―, (IIb)

said repeating units [I] and [II] being bonded, alternately, which comprises polycondensing a 4,4'-dihaloterephthalophenone and/or a 4,4'-dihalobenzophenone with 4- hydroxythiophenol and/or p-dimercaptobenzene in the presence of an alkali using an aromatic ketone or an aromatic sulfone as a solvent.

15. A process according to claim 14, wherein the alkali is at least one member selected from the group consisting of carbonates and bicarbonates of alkali metals.

16. A process for producing a crystalline aromatic polyketone having a linear polymer structure substantially comprising repeating units [I] of the formulae:

―◯―CO―◯―CO―◯― (Ia)

and/or

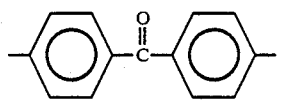 (Ib)

and repeating units [II] of the formulae:

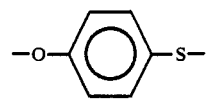 (IIa)

and/or

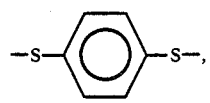 (IIb)

said repeating units [I] and [II] being bonded alternately, which comprises polycondensing a 4,4'-dihaloterephthalophenone and/or a 4,4'-dihalobenzophenone with an alkali metal salt of 4-hydroxythiophenol and/or an alkali metal salt of p-dimercaptobenzene using an aromatic ketone or an aromatic sulfone as a solvent.

17. A process according to claim 14, wherein the polycondensation is carried out at a temperature of 200° to 400° C.

18. A process according to claim 14, wherein the aromatic ketone is a benzophenone compound of the formula:

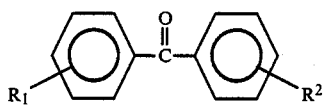

wherein $R^1$ and $R^2$ are independently a hydrogen atom, an alkyl group having 1 to 3 carbon atoms or a phenyl group.

19. A process according to claim 18, wherein the benzophenone compound is benzophenone.

20. A process according to claim 14, wherein the aromatic ketone is a xanthone or thioxanthone compound of the formula:

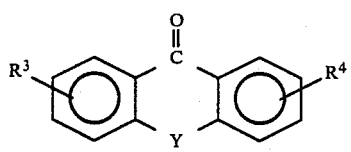

wherein $R^3$ and $R^4$ are independently a hydrogen atom, an alkyl group having 1 to 3 carbon atoms, or a phenyl group; and Y is an oxygen atom or a sulfur atom.

21. A process according to claim 20, wherein the xanthone or thioxanthone copound is xanthone.

22. A process according to claim 20, wherein the xanthone or thioxanthone compound is thioxanthone.

23. A process according to claim 14, wherein the aromatic sulfone is at least one compound selected from aromatic sulfones of the formulae:

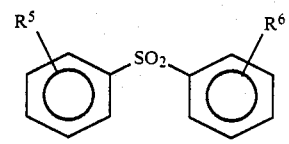

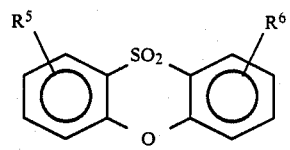

and

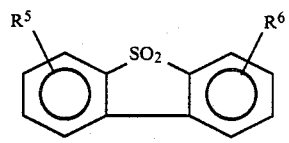

wherein $R^5$ and $R^6$ are independently a hydrogen atom, an alkyl group having 1 to 3 carbon atoms or a phenyl group.

24. A process according to claim 23, wherein the aromatic sulfone is diphenylsulfone.

25. A crystalline aromatic polyketone having a linear polymer structure substantially comprising repeating units [I] of the formulae:

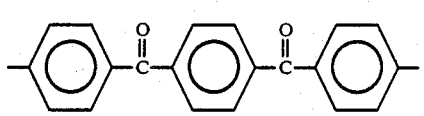 (Ia)

and/or

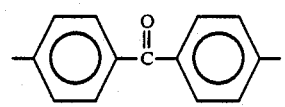 (Ib)

and repeating units [II] of the formulae:

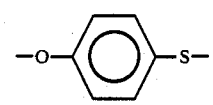 (IIa)

and/or

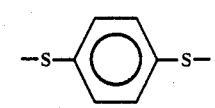 (IIb)

said repeating units [I] and [II] being bonded alternately, and said polymer having an intrinsic viscosity of 0.4 or more, obtained by polycondensing a 4,4'-dihaloterephthalophenone and/or a 4,4'-dihalobenzophenone with 4-hydroxythiophenol and/or p-dimercaptobenzene in the presence of an alkali.

26. A crystalline aromatic polyketone having a linear polymer structure substantially comprising repeating units [I] of the formulae:

(Ia)

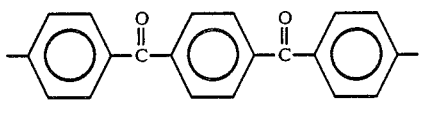

and/or (Ib)

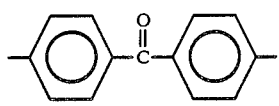

and repeating units [II] of the formulae:

(IIa)

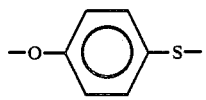

and/or (IIb)

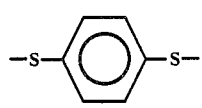

said repeating units [I] and [II] being bonded alternately, and said polymer having an intrinsic viscosity of 0.4 or more, obtained by polycondensing a 4,4'-dihaloterephthalophenone and/or a 4,4'-dihalobenzophenone with an alkali metal salt of 4-hydroxyethiophenol and/or an alkali metal salt of p-dimercaptobenzene.

27. A crystalline aromatic polyketone according to claim 25, wherein the polycondensation is conducted by using an aromatic ketone or an aromatic sulfone as a solvent.

28. A crystalline aromatic polyketone according to claim 25, wherein the polymer has an intrinsic viscosity of 0.4 to 1.8.

29. A crystalline aromatic polyketone according to claim 27, wherein the polymer has an intrinsic viscosity of 0.4 to 1.8.

30. A crystalline aromatic polyketone according to claim 25, wherein the 4,4'-dihaloterephthalophenone is 4,4'-difluoroterephthalophenone, 4,4'-dichloroterephthalophenone and/or 4-fluoro-4'-chloroterephthalophenone, and the 4,4'-dihalobenzophenone is 4,4'-difluorobenzophenone, 4,4'-dichlorobenzophenone and/or 4-fluoro-4'-chlorobenzophenone.

31. A process according to claim 14, wherein the 4,4'-dihaloterephthalophenone is 4,4'-difluoroterephthalophenone, 4,4'-dichloroterephthalophenone and/or 4-fluoro-4'-chloroterephthalophenone, and the 4,4'-dihalobenzene is 4,4'-difluorobenzophenone, 4,4'-dichlorobenzophenone and/or 4-fluoro-4'-chlorobenzophenone.

* * * * *